United States Patent [19]
Koseko

[11] Patent Number: 6,015,514
[45] Date of Patent: Jan. 18, 2000

[54] METHOD AND METALLIC MOLD FOR PRODUCING MOLDED PLASTIC PRODUCTS

[75] Inventor: Hisaaki Koseko, Atsugi, Japan

[73] Assignee: Ricoh Company, Ltd., Tokyo, Japan

[21] Appl. No.: 08/966,248

[22] Filed: Nov. 7, 1997

[30] Foreign Application Priority Data

| Nov. 7, 1993 | [JP] | Japan | 8-294689 |
| May 16, 1997 | [JP] | Japan | 9-126151 |
| Jun. 20, 1997 | [JP] | Japan | 9-164316 |

[51] Int. Cl.[7] ............... B29C 45/56; B29C 45/73
[52] U.S. Cl. ........... 264/40.1; 264/2.2; 264/328.7; 264/328.16; 264/336
[58] Field of Search .................. 264/40.1, 40.5, 264/40.6, 328.7, 328.9, 106, 107, 328.11, 328.16, 334, 335, 336, 2.2, 2.3, 1.31, 1.32, 1.33

[56] References Cited

U.S. PATENT DOCUMENTS

| 4,882,117 | 11/1989 | Takeada et al. | 264/328.9 |
| 4,961,884 | 10/1990 | Watanabe et al. | 264/335 |
| 4,986,938 | 1/1991 | Izuka et al. | 264/328.7 |
| 5,093,049 | 3/1992 | Uehara et al. | 264/328.7 |
| 5,330,693 | 7/1994 | Takada | 264/334 |
| 5,547,619 | 8/1996 | Obayashi | 264/40.1 |
| 5,705,105 | 1/1998 | Inoue | 264/328.7 |
| 5,868,978 | 2/1999 | Kadoriku et al. | 264/40.5 |

OTHER PUBLICATIONS

Frados, Joel, Plastics Engineering Handbook of the Society of the Plastics Industry, Inc., 4th edition, pp. 273–276, 1976.

*Primary Examiner*—Jill L. Heitbrink
*Attorney, Agent, or Firm*—Oblon, Spivak, McClelland, Maier & Neustadt, P.C.

[57] ABSTRACT

An apparatus and method of producing molded plastic products provides the molded plastic products of high accuracy and with short molding cycle. A resin is placed in a cavity of a mold for forming the product therein. When the resin cools in the cavity of the mold to a temperature lower than the softening temperature of the resin, air gaps are forcibly formed between the resin and the plural cavity pieces, by slidably moving the cavity pieces so as to part the cavity pieces from the resin. The mechanism for forming the air gaps is included as part of the apparatus, and the method includes the step of forceably forming the air gaps.

38 Claims, 14 Drawing Sheets

METHOD AND METALLIC MOLD FOR PRODUCING MOLDED PLASTIC PRODUCTS

BACKGROUND OF THE INVENTION

1. Field of the Invention

The present invention relates to a method and apparatus for producing molded plastic products applicable to an optical scanning system such as laser beam printer, facsimile device, etc., an optical instrument such as video camera, an optical disc, and in particular, a molding method and a metallic mold for producing molded plastic products capable of transferring a high-accuracy mirror surface or a delicate concave/convex pattern to the molded product.

2. Discussion of the Background

Generally, as to an injection type molding method, the temperature of a metallic mold is made approximately equal to the thermal deformation temperature of the molded resin. Fused resin is then injected into a cavity of constant capacity formed in the metallic mold in order to fill the cavity with the resin. After gradually cooling the fused resin under a controlled pressure, the metallic mold is opened and the molded plastic products is removed therefrom.

However, according to the above-mentioned method, the temperature distribution at the time of cooling the resin may become the pressure distribution in some cases. For example in the case of producing thick structures and structures with unbalanced (uneven) thicknesses, although the molding cycle can be shortened, remaining pressure is produced in the thickness portion thereof and high-precision molded plastic products cannot be obtained due to shrinkage on the thick structure portion. Such matters are defects in conventional apparatuses and methods to be solved.

An injection type molding method that is less subject to such troublesome defects, for instance, is discussed in Japanese Laid-open Patent Publication No. 62-11619/1987 (hereinafter, called "first prior art"). The first prior art document describes that after the temperature of the metallic mold is set to a value equal to or higher than the softening temperature of the resin to be molded (glass critical point temperature of the non-crystal resin), the fused resin is injected into the cavity of constant capacity (volume) in order to fill the cavity with the resin, for making a gate seal. After producing a constant inner pressure of the resin, the fused resin is cooled, and the metallic mold is opened and the cooled resin is removed at a temperature not higher than the thermal deformation temperature. As such, the resin is cooled after the inner pressure of the resin is produced, and so the molded plastic products having the unbalanced thickness structure or thick structure, and large opening diameter can be molded with high accuracy.

There is another method described in Japanese Laid-open Patent Publication No. 61-19327/1986 (hereinafter, called "second prior art"). The second prior art document describes that, after the temperature of the metallic mold is set to a value equal to or higher than the softening temperature of the resin to be molded (glass critical point temperature of the non-crystal resin), the fused resin is injected into the cavity in order to fill the cavity with the resin.

Next, after the resin in the cavity is indirectly compressed and cooled at the same time through the molding piece for creating the cavity (hereinafter, called "cavity piece") by use of a pressurizing cylinder, the metallic mold is opened at a temperature not higher than the thermal deformation temperature and the cooled resin is removed therefrom.

In products molded according to such conventional processes, the resin is compressed at the time of cooling, so that even the molded plastic product of unbalanced thickness structure, thick structure, and large opening diameter can be molded with high accuracy.

In the molding method of the second prior art, since the temperature difference of the metallic mold occurred inevitably at the time of injecting/filling of the fused resin, and at the time of removing the molded plastic products, the molding cycle of the molded plastic products takes a long time to complete, and thus is problem to be solved.

Another method is described in Japanese Laid-open Patent Publication No. 63-114614 (hereinafter, called "third prior art"). In the third prior art, after setting the temperature of the metallic mold to a constant value that is approximately equal to the thermal deformation temperature, and the fused resin is injected into the cavity with a low pressure in order to fill the cavity with the resin, the fused resin is compressed from one side by use of a compressing mechanism in the metallic mold and thereby the contraction due to the cooling and solidifying of the resin can be compensated. In such way, molded plastic products of high accuracy can be obtained.

Still another method is described in Japanese Laid-open Patent Publication No. 8-234005/1996 (hereinafter, called "fourth prior art"). This fourth prior art document describes a method for manufacturing an optical reflection mirror, in which the filling of the resin is ceased immediately before the completion of a resin filling operation, and the resin is brought into close contact with the mirror forming surface. A wetting property (adhesion force) is lowered at the opposing surface and thereby the close adhesion force with the resin is also reduced, as is the amount of shrinkage on the surface with the close-adhesion force.

Another method is described in Japanese Laid-open Patent Publication No. 6-98642/1994 (hereinafter, called "fifth prior art"), directed to a method of manufacturing an optical reflection mirror. This document describes that the wetting property (adhesion force) of the surface opposing the mirror forming surface is lowered to a value lower than that of the mirror forming surface, and further the molded plastic products can be obtained without applying any controlled pressure to the plastic material that fills the metallic mold.

There in still another method as described in Japanese Laid-open Patent Publication No. 6-304973/1994 (hereinafter' called "sixth prior art"). This document describes that the pressure difference is produced after the injecting/filling operation between the transferring section and the air vent outlet is performed so that the shrinkage can be produced on a notifying outlet portion.

However, in the molding method of the first prior art, since it was necessary to make the resin inner pressure equal to the atmospheric pressure when the metallic mold was opened, the resin inner pressure at the time of injecting and filling the fused resin had to be made considerably high. Therefore, a high-cost metallic mold capable of enduring the high pressure had to be prepared, and a temperature difference of the metallic mold inevitably occurred when injecting/filling the fused resin and when removing the molded plastic products. As a result, and as identified by the present inventor, the molding cycle of the molded plastic products is lengthy.

In the molding method of the third prior art, since the resin was compressed by a compressing force received from the one side, and the resin was partially solidified at the time of compression, the unbalanced distribution of pressure occurred in the compressing direction for the resin having unbalanced structure and thick structure. Consequently, producing molded plastic products of high accuracy could not be obtained, which the present inventor identified as a problem to be solved.

In the molding method of the fourth prior art, since the resin was compressed by receiving a compressing force from the one side, the resin was partially solidified at the time of compression and so the unbalanced distribution of pressure occurred in the compressing direction for the resin having unbalanced thickness structure and thick structure. Consequently, obtaining molded plastic products of high accuracy could not be obtained with this method and is a problem to be solved.

Furthermore, in the molding method of the forth prior art, although the method was applicable to resin of not a thick structure, such as a mirror or the resin having a surface opposing thereto which can be shrunk, since almost all of another side is not wetted for the resin of thick structure and unbalanced thickness structure, the thermal conductivity from the fused resin to the metallic mold turned out to be unsatisfactory. In addition, cooling time was excessive, and was not applicable to uses requiring a high-accuracy transferring property on the opposing surface, such as for a lens or the like.

While this molding method obtained the high-accuracy molded plastic products even for the resin of unbalanced thickness structure and thick structure, the molding cycle turned out to be long, and high-accuracy molded plastic products could not be obtained for the resin of unbalanced thickness structure and thick structure when using a short molding cycle method.

In the fifth prior art, if the method was not limited to the surface opposing the transferring surface, the transferring property of the transferring surface was lowered, so the method was not applicable to operations requiring the transferring property of the opposing surface such as for lens or the like. Since a controlled pressure was not applied thereto, even though the side surface excluding the transferring surface utilized as the standard surface, it is impossible to realize the accuracy of the standard surface. This is a problem to be solved.

In the molding method of the sixth prior art, the shrinkage did not occur until the resin inner pressure, due to the cooling of the resin after filling the cavity with the resin, became not larger than the atmospheric pressure. In the molded plastic products of thick structure and unbalanced thickness structure, the pressure at the resin of thick structure portion rapidly became equal to or lower than the atmospheric pressure. However, regarding the timing thereof, since the resin in the thin structure portion had been already cooled and solidified under the initial high pressure, an internal distortion remained in the resin of thin structure, and so an accuracy of the transferring surface turned out to be lower due to the remaining pressure.

A conventional prior-art method of producing the molded plastic products is described hereinafter on the basis of FIG. 1 and FIG. 2. Hereupon, FIG. 1 is an explanatory diagram showing a conventional method of injecting and molding resin, and FIGS. 2a and 2b are explanatory diagrams showing general (prior-art) methods of molding the resin by injecting and compressing the same.

In FIG. 1, the reference numerals 1 and 2 respectively represent a pair of metallic molds that form therein an unbalanced thickness structure and thick structure cavity 3 of a constant capacity and having a transferring surface on at least one of the cavity surfaces. FIG. 1 shows a state of keeping the temperature of the metallic molds 1 and 2 to the thermal deformation temperature of the resin and filling the cavity 3 with the fused resin 4.

On this occasion, since the cavity 3 has the unbalanced thickness structure and the thick structure, the resin 4 is heated to the fusing temperature at the time of filling the cavity is sharply cooled from the tip end portion of the thin structure thereof. For this reason, as shown in FIG. 1, a shrinkage area A appears on the thick structure portion at the center portion thereof and the resin inner pressure remains on the tip end portion in the thin structure area at the same time. When the metallic mold is opened, the pressure is released and one resin expands. As the result, the molded plastic products of high accuracy cannot be obtained.

In FIGS. 2a and 2b, the reference numerals 5 and 6 respectively represent (a pair of) metallic molds forming therein an unbalanced thickness structure and thick structure cavity 7 of a constant capacity and having a transferring surface on at least one of the cavity surfaces. The above-mentioned cavity pieces 5 and 6 are respectively provided slidably of the upper metallic mold (die) 8 and the lower metallic mold (die) 9.

On this occasion, as shown in FIG. 2a, keeping the temperature of the metallic molds 8 and 9 approximately equal to the thermal deformation temperature of the resin, the cavity 7 is filled with the fused resin. Because the cavity of unbalanced thickness structure and thick structure is used, the resin 10 put in the state of fusing temperature at the time of filling the cavity starts to be sharply cooled and solidified from the both tip ends of the thin structure portion. Furthermore, in accordance with the solidifying of the resin, the cavity piece 6 is slidably moved and thereby the resin is compressed, as shown in FIG. 2b. Consequently, although the extent of shrinkage can be reduced, so as to avoid the problem illustrated in FIG. 1, the resin rapidly solidifies at the tip end portion B and so the solidified resin receives a compressive force.

For this reason, the resin inner pressure remains at the tip end portion B of the thin structure, and the pressure of the resin is released when the metallic molds 8 and 9 are opened, and further the resin expands at the same time. Therefore, the molded plastic products cannot be obtained with high accuracy.

SUMMARY OF THE INVENTION

Accordingly, one object of this invention is to provide a novel method and system for producing a molded product that overcomes the above-mentioned limitations of existing methods and systems, such as those previously discussed.

It is an object of the present invention to solve the problems as mentioned heretofore.

It is another object of the present invention to provide an improved method of producing molded plastic products applicable to an optical scanning system.

It is still another object of the present invention to provide an improved metallic mold for producing the molded plastic products applicable to an optical scanning system.

It is still another object of the present invention to provide an improved method of producing the molded plastic products applicable to an optical scanning system for obtaining the highly accurate molded plastic products with a short molding cycle.

It is still another object of the present invention to provide an improved metallic mold for producing the molded plastic products applicable to an optical scanning system capable of obtaining the molded plastic products of high accuracy with short molding cycle.

Generally, these and other objects are obtained with an apparatus and method for molding plastic products with high accuracy and short molding cycle by employing a metallic mold for producing the molded plastic products. When the fused resin cools to a predetermined temperature, lower than a softening temperature, air gaps are forcibly formed between the resin and the plural cavity pieces, by slidably moving the cavity pieces so as to part them from the resin. Creating the air gaps prevents a distortion of the molded product for occurring.

In the first status of the present invention, in order to solve the subject matter as mentioned heretofore, a pair of metallic molds having at least one or more transferring surfaces, slidably provided with at least one or more cavity pieces on surfaces excluding the transferring surfaces, and including at least one or more cavities formed therein by the transferring surfaces and the cavity pieces are prepared, the metallic mold is heated, keeping the heating temperature lower than the softening temperature of resin. The cavities are then filled with fused resin heated to a temperature higher than the softening temperature of the resin by injecting the fused resin so that the resin exerts pressure on the transferring surfaces and thereby the resin is caused to tightly stick on the transforming surfaces. Next, the resin is cooled thereafter to a temperature not higher than the softening temperature of the resin. The metallic mold is then opened and next the resin, thus cooled, is removed therefrom. At least one or more cavity pieces is caused to slide so as to part the cavity pieces from the resin when the fused resin is cooled to the softening temperature of the resin, and thereby an air gap is forcibly formed the resin and the cavity pieces.

On this occasion, by injecting the fused resin into the cavity to fill the cavity, suitable resin inner pressure is generated in the cavity and the resin is closely adhered onto the transferring surface. Furthermore, in the state that the suitable pressure remains for close adhesion thereto, an air gap is forcibly formed between the resin and the cavity piece. Thereby, the resin surface of the resin portion facing the air gap becomes a free surface, and the surface can move more easily than the surface facing the other metallic mold.

For this reason, the thermal conductivity from the resin portion is lowered due to the existence of the air gap and the cooling speed of this resin portion becomes lowest. Namely, this resin portion becomes in a highest temperature and lowest viscosity state in the cavity.

As the result, the contraction caused by the cooling is absorbed due to the movement of the resin of this portion. The resin portion facing the air gap is shrunk with priority, and consequently, the occurrence of shrinkage on the transferring surface is prevented so that a desirable transferring surface can be faithfully transferred with short molding cycle.

Furthermore, since the resin inner pressure exerted on the transferring surface at the time of cooling can be approximated to the atmospheric pressure, so it is possible to obtain molded products with small optical elasticity distortion. Moreover, the reason why the temperature of the metallic mold is set to a temperature lower than the softening temperature of the resin is that, if the temperature of the metallic mold is set to a temperature not lower than the softening temperature of the resin, the molded products are deformed at the time of taking out the molded product from the metallic mold and thereby the molded products of high accuracy cannot be obtained.

In the second status of the present invention relating to the first status, in order to solve the above-mentioned subject matter, the starting time of starting the formation of the air gap is set by causing the cavity pieces to slide at a time when the center portion of the resin in the cavities is not lower than the softening temperature of the resin in a state where a surface layer portion thereof is solidified with the temperature lower than the softening temperature of the resin and when the average temperature from the surface layer portion thereof to the center portion thereof is not lower than the softening temperature of the resin.

On this occasion, although, when the air gap is formed at the time of cooling, the surface defining the air gap and the resin are brought into close contact with each other, so the surface layer of the resin is solidified, and the peeling-off therebetween can be done easily, and further, the surface layer at the time of peeling off is not largely deformed. Furthermore, since the average temperature thereof is set to a temperature not lower than the softening temperature of the resin after creating the air gap when peeled-off, the temperature of the resin portion is raised, inversely, to the softening temperature of the resin and the resin is made in to have a low viscosity so that a movement of the resin portion can be done easily, owing to the heat-shutting effect of the resin portion facing the air gap and the uniformity of the temperature.

In the third status of the invention relating to the first or second statue, in order to solve the above-mentioned subject matter, the pressure in the cavity pieces is set to a value from 0.05 MPa to 6 MPa.

On that occasion, by setting the pressure in the air gap to a value in the range of 0.05 MPa~6 MPa, a constant pressure can be generated so as to enhance the contraction/movement of the resin portion facing the gap when the resin is cooled. Moreover, if the pressure in the air gap is not higher than 6 MPa, it is not preferable because high cost pressure generating apparatus equipment is needed, and the distortion due to the pressure thus generated remains in the molded products.

It is further preferable to set the pressure in the air gap to 0.1 MPa~2 MPa.

In the fourth status of the present invention relating to either one of the first through third statuses, in order to solve the above-mentioned subject matter, the pressure on the transferring surface immediately before the time of forming the air gap by causing the cavity pieces to slide is set to a value from 0.5 MPa to 60 MPa. On that occasion, the transferring property of the transferring surface at the time of generating the air gap can be prevented from lowering to below an acceptable level. In the case of setting the pressure of the transferring surface to a value lower than 0.5 MPa, the transferring surface is unfavorably peeled off at the time of generating the air gap. On the contrary, in the case of setting the pressure of the transferring surface to a value not lower than 60 MPa, it is also unfavorable because the inner pressing force of the molded products themselves increases and a pressing force remains.

In the fifth status of the invention relating to either one of the first through fourth statuses, in order to solve the above subject matter, a material having fine holes employed as the cavity pieces is prepared, pumping-out gas is pumped out into the side of the resin through the fine holes in the cavity pieces, and causes the cavity pieces to slide in order to form the air gap. On that occasion, the slidably moving property of the cavity piece can be improved and the peeling-off between the cavity surface forming the air gap and the resin can be done easily. Consequently, the easy of molding operation is improved.

In the sixth status of the invention relating to either one of the first through fifth statuses, in order to solve the above subject matter, in the plastic molding method, a non-crystal substance resin is employed as the resin, and the softening temperature of the non-crystal substance resin is equal to the glass critical point temperature. On that occasion, since the contracting properly of the resin is preferable, it is possible to easily obtain high molding accuracy.

In the seventh status of the invention relating to either one of the first through sixth statuses, in order to solve the above subject matter, the cavity pieces are brought into contact with the surface adjacent to the transferring surface, and the air gap is formed also on the surface adjacent to the transferring surface when the cavity pieces are caused to slide. On that occasion, since the entire surface adjacent to the transferring surface is released when the air gap is generated, the resin facing the air gap can be easily contracted when the resin is contracted by cooling. Consequently, the transferring accuracy of the transferring surface can be improved relative to conventional devices.

In the eighth status of the invention relating to either one of the first through sixth statuses, in order to solve the above subject matter, the surface for forming the air gap is parted by at least 1 mm from the effective area on the transferring surface. On that occasion, by preventing the unnecessary deformation of the resin portion brought into contact therewith, a degrading influence exerted on the molded products can be also prevented.

In the ninth status of the invention, in order to solve the above subject matter, the metallic mold comprises a molding surface for forming a cavity of predetermined volume defined by each wall surface, and a transferring surface formed on at least one or more of the walls of the molding surface and transferring a mirror surface onto resin. The cavity is filled with fused resin treated to a temperature equal to or higher than the softening temperature of the resin by injecting the fused resin into the cavity, and thereafter a transferring surface is transferred onto the resin by way of the resin pressure generated in the resin. There are provided cavity pieces slidably forming all of or a part of at least one or more wall surfaces of the molding surface, excluding the transferring surfaces. An air gap is formed between the resin and the cavity pieces by causing the cavity pieces to slide so as to part the cavity pieces from the resin when the resin pressure becomes equal to a predetermined pressure. On that occasion, an adequate resin inner pressure is generated in the cavity by injecting/filling the resin therein and the resin closely attaching to the transferring surface. Further, the air gap is forcibly formed between the resin and the cavity piece so as to leave a suitable pressure for keeping the close attachment thereof. Consequently, the resin surface of the resin portion facing the air gap becomes the free surface, and the surface coming into contact with the other molding surface. For this reason, the heat conductivity from the resin portion is lowered due to the existence of the air gap and therefore the resin portion is cooled most slowly.

For this reason, the contraction caused by cooling can be absorbed by the movement of the resin and the resin portion facing the air gap is shrunk with priority; otherwise, the resin expands. Thereby, the concave or convex surface can be selectively formed and the occurrence shrinkage can be prevented on the transferring surface. As the result, even though the molded products have a thick structure or unbalanced thickness structure, it is possible to obtain the molded products with small distortion and capable of securing the shape accuracy of the transferring surface.

Furthermore, even in the case of setting the temperature of the metallic mold to a temperature not higher than the softening temperature of the resin, a desired shape accuracy can be secured. Therefore, the cooling time of the resin can be shortened and the molding time of the molded products can be also shortened. Consequently, the manufacturing cost of the molded products can be reduced relative to conventional approaches.

In the tenth status of the invention relating to the ninth status, in order to solve the above-described subject matter, the resin pressure in the cavity at the time of parting the cavity pieces from the resin is set to a value in the range from 0.5 MPa to 60 MPa. On that occasion, the concave or convex molding surface can be selectively formed on the molding surface of the resin formed (molded) by the cavity piece. Moreover, in the case of setting the resin pressure, at the time of being parted, to a value lower than 0.5 MPa, the transferring surface is unfavorably peeled off. On the contrary, in the case of setting the resin pressure at the time of being parted, the inner stress of the molded products themselves increases and the remaining stress remains in tact.

In the eleventh status of the invention relating to the ninth or tenth statuses, in order to solve the above-described subject matter, the metallic mold includes a pressure controlling apparatus for pressurizing the cavity pieces, and the cavity pieces are pressurized by the pressure controlling apparatus such that the resin pressure in the cavity becomes equal to or higher than a predetermined pressure. On that occasion, the cavity piece can be prevented from moving so as to be parted form the cavity piece owing to the pressure of the resin generated when the fused resin is injected into the cavity to fill it with the resin.

In the twelfth status of the invention relating to the eleventh status, and in order to solve the above-described subject matter, the pressure controlling apparatus includes a driving mechanism composed of an oil-pressure cylinder or an electrically-driven motor, and the cavity pieces are slidably moved by the driving means. On that occasion, since the pressure and the slidably moving of the cavity pieces can be done by use of the drive medium composed of the oil-pressure cylinder or the electrically driven motor, the pressure controlling apparatus can be made with simple structure, and thereby, the metallic mold for molding use can be made with simple structure.

In the thirteenth status of the invention relating to either one of the ninth through twelfth status, in order to solve the above subject matter, there is provided in the cavity a pressure detector for detecting the resin pressure in the cavity, and there is further provided in the cavity a sliding mechanism for slidably moving the cavity pieces in response to information from the pressure controller. On that occasion, since the resin inner pressure or the movement timing of the cavity piece can be controlled with high accuracy, the convex or concave surface can be stably formed on the molding surface facing the air gap, during the time of successively producing the molded products.

In the fourteenth status of the invention relating to either one of the ninth through thirteenth statuses, in order to solve the above-described subject matter, at least one or more vent holes is provided between the cavity piece and the slidably moving surface of the cavity, and the vent hole is formed on a position where the vent hole can communicate with the air gap between the resin and the cavity piece when the cavity piece slidably moves in a direction of parting the cavity piece from the resin. On that occasion, when the cavity piece is moved so as to part from the resin, air (or other atmospheric gas) flows into the air gap between the cavity pieces and the resin, thereby the pressure in the air gap can be approximated to the atmospheric pressure, and the cavity piece can be promptly parted from the resin. As a result, the concave or convex surface can be stably formed and a shape accuracy of the transferring surface can be further improved.

In the fifteenth status of the invention relating to the fourteenth status, in order to solve the above-described subject matter, the vent hole can cause the air gap between the resin and the cavity piece to communicate with the exterior of the metallic mold when the cavity piece slidably moves in a direction of parting from the resin. On that occasion, the atmospheric air surely flows into the air gap between the cavity piece and the resin through the vent hole.

In the sixteenth status of the invention relating to either one of the ninth through fifteenth statuses, in order to solve the above-described subject matter, the forming surface of the cavity piece is treated with surface processing by use of a substance having a low sticking force with the resin. On that occasion, the cavity piece can be easily parted from the resin and thereby the shape accuracy of the transferring surface can be further improved.

In the nineteenth status of the invention relating to the fourteenth or fifteenth status, in order to solve the above subject matter, a step is formed on a connection surface for connecting the cavity piece and the transferring surface. The reason why the above structure in adopted is that, although there is a possibility that the air goes around in the air gap between the cavity piece and the resin through the vent hole and thereby deteriorating the shape accuracy of the molded products, by forming the step on the connecting surface between the cavity piece and the transferring surface, it can be prevented that the air goes around in the air gap between the cavity piece and the resin through the vent hole. Consequently, the shape accuracy of the molded product can be prevented from becoming deteriorated.

In the twentieth status of the invention, in order to solve the above subject matter, a pair of metallic molds having at least one or more transferring surfaces for transferring a mirror surface onto a resin is prepared. The molds are provided with at least one or more cavity pieces on the other surface, other than the transferring surface, so as to freely slidably move thereon. At least one or more cavities are formed by use of the transferring surface and the cavity piece, and the state of heating of the metallic molds in kept at a temperature lower than the softening temperature of the resin. The cavity is filled with the resin by injecting the fused resin heated with the softening temperature of the resin, and next, the resin is cooled to the temperature equal to or lower than the softening temperature of the resin after generating the resin pressure onto the transferring surface and thereby tightly attaching the resin onto the transferring surface. The metallic mold is then opened and the molded plastic products are taken out. At least one or more of the cavity pieces is (are) slidably moved so as to part it (them) from the resin when the fused resin to the temperature lower than the softening temperature of the resin, and thereby an air gap is forcibly formed between a part of or all of at least one surface excluding the transferring surface and the cavity piece. A preference is taken for a part corresponding to a thin thickness portion of the plastic molded products at the time of forming the air gap.

The reason why the above-mentioned structure is adopted is as follows. By slidably moving the cavity piece on the air gap forming surface of the cavity, the air gap is forcibly formed between a part of or all of at least one surface excluding the transferring surface, and the portion facing the air gap is caused to move more easily than the other portion. Thereby, the contraction caused by cooling can be absorbed by moving the portion, and the mistransferring on the transferring surface can be prevented as one of the primary objects of the present invention.

As the principle, at first, the fused resin is injected into the metallic mold having a temperature lower than the softening temperature of the resin in order to fill the cavity with the resin. And thereafter, the air gap is formed and thereby the resin inner pressure is approximately the same as the atmospheric pressure. In such a manner, it can be prevented that the solidified portion of the unbalanced thickness structure is generated after injecting/filling of the resin, and further the inner pressure of the resin exists in the state of unbalanced (uneven) condition due to the temperature distribution.

However, the timing of solidification on the surface layer portion at this time is a very important factor. If the timing thereof is early and the solidification layer is thin, the resin is removed with the slidably moving portion when brought into close contact therewith at the time of forming the air gap, but such results adversely effect the transferring property of the transferring surface itself. On the contrary, when the timing is delayed, and the solidification of the resin progresses to a considerable extent, there is no problem in forming the air gap by utilizing the slidable movement of the cavity piece. However, the resin inner pressure has already unevenly remained in the solidifying portion in the cavity. Furthermore, the flowing (fluid) property turns out to be less than desirable, which results in the remaining of the inner distortion causing the optical distortion and the deterioration of the transferring surface accuracy.

In particular, in the case of obtaining the molded products of thick structure, unbalanced thickness structure, and large-diameter opening, the portion corresponding to the thin structure portion of the molded products is cooled early and the pressure is apt to remain. Consequently, even though the side surface is slidably moved in order to form the air gap and the resin portion facing the air gap is caused to easily move as the free surface, it is too late to restore the normal state after the resin is cooled and solidified and the temperature thereof becomes a temperature near the thermal deformation temperature of the resin.

Consequently, in the present invention, the air gap is formed therein with priority and with a timing such that the surface excluding the transferring surface corresponding to the thin structure portion of the molded product can be moved as a free surface. Thus, the deterioration of the transferring property due to the increase of the inner distortion and the deterioration of the transferring property due to the pressure distribution can the prevented.

In the twenty-first status of the invention relating to the twentieth status, in order to solve the above-described subject matter, the air gap is formed in multiple steps in a part corresponding to a thick structure portion of the molded plastic products, after forming the air gap in a part corresponding to a thin structure portion of the molded plastic products. On that occasion, when the thick structure portion is formed at the same time on the standard of the temperature of the thin structure portion and the resin inner pressure, since the thick structure portion includes the portion of high temperature approximately equal to fusing temperature, the resin is taken off to the cavity piece and the transferring property becomes deteriorated on the circumferential portion and the transferring portion. On the contrary, in the present invention, by forming the portion corresponding to the thin structure portion of the molded plastic products to the portion corresponding to the thick structure portion thereof, it is possible to prevent the pressure from remaining on the transferring surfaces corresponding to the respective places and thereby the inner distortion increases, and further the accuracy of the transferring surface is degraded.

In the twenty-second status of the invention relating to the twentieth or twenty-first status, in order to solve the above described subject matter, an air gap is formed in a portion excluding a part of the same side surface of the molded plastic products and another portion on which no air gap is formed in a standard surface at the time of fixing the molded products to the other parts. On that occasion, since the accuracy of the air gap forming portion is need not be so strictly formed, by securing the accuracy of the standard surface at the time of fixing the molded products, the molded products can be fixed to the other parts with high accuracy.

In the twenty-third status of the invention relating to either one of the twentieth through twenty-second status, in order to solve the above subject matter, a pressure sensor is disposed at the forming portion of the air gap or adjacent thereto, and when the value of pressure detected by the pressure sensor reaches a predetermined value, the air gap is formed by slidably moving the cavity piece. On that occasion, the air gap can be formed with the optimum balance between the cooling/solidifying area of the outer circumferential portion of the resin facing the cavity wall surface and the area of a temperature not lower than the softening temperature at the center portion of the cavity. It is thus possible to a further extent to prevent the increase of the internal distortion and the lowering of the transferring property due to the pressure distribution.

In the twenty-fourth status of the invention relating to either one of the twentieth through twenty-second statuses, in order to solve the above-described subject matter, temperature distribution data of the resin in the cavity are sampled previously, and the temperature on a specified position in the cavity corresponding to the cavity piece becomes equal to the predetermined temperature of the sampled data, the air gap is formed by slidably moving the cavity piece. On that occasion, the air gap can be formed with the optimum balance between the cooling/solidifying area of the outer circumferential portion of the resin facing the cavity wall surface and the area of a temperature not lower then the softening temperature at the center portion of the cavity, and it is possible to a further extent to prevent the lowering of the transferring property due to the increase of the internal distortion and the pressure distribution.

In the twenty-fifth status of the invention relating to the twenty-fourth status, in order to solve the above-described subject matter, the transferring surface of the cavity is divided into some sections, and the predetermined temperature is set to a value equal to or higher than the softening temperature of the resin on the cross-sectional surface center in the slidably moving direction of the cavity piece. The reason why such a structure is adopted is that, as the timing of forming the air gap with the optimum balance between the cooling/solidifying area of the outer circumferential portion or the resin facing the cavity wall surface and the area of a temperature not lower than the softening temperature at the center portion of the cavity, the transferring surface is divided and the predetermined temperature is set to a temperature not lower than the softening temperature of the resin at the center of the cross section in the slidably moving direction of the cavity piece, and the marginal factor (rate) of the resin can be lowered even when the air gap is formed in the case of excessively cooling the resin, so it can further be prevented that the internal distortion remains and the mistransferring on the transferring surface. As a matter of course, in case that the air gap is formed partially in the thin structure portion, the transferring surface of the cavity is divided at that portion, and the predetermined temperature turns out to be the temperature of the cross section center portion in the slidably moving direction.

In the twenty-sixth status of the invention relating to either one of the twenty-third through twenty-sixth statuses, in order to solve the above subject matter, the air gap is formed by slidably moving the cavity piece on the basis of at least one of the resin pressure due to the pressure sensor and the resin temperature due to the temperature distribution data. On that occasion, in the case of forming the air gap in step-wise fashion, it can be prevented to a further extent that the pressure remains on the transferring surfaces corresponding to the respective places, and thereby, the internal distortion increases and the lowering of the transferring occurs.

Moreover, the resin pressure is approaches the atmospheric pressure at the time of forming the air gap for the first time, and it is more effective to form the air gap on the basis of the temperature data instead of the pressure signal in the case of forming the air gap at the second and subsequent stages. In the twenty-seventh status of the invention relating to either one of the twentieth through twenty-sixth statuses, in order to solve the above subject matter, the air gap is formed by slidably moving the cavity piece utilizing the slidably moving means provided separately from the cavity piece. On that occasion, it is possible to simplify the construction of the plastic molding apparatus.

In the twenty-eighth status of the invention relating to either one of the twentieth through twenty-sixth statuses, in order to solve the above-described subject matter, the air gap is formed by slidably moving the cavity piece utilizing the metallic mold opening force for the metallic mold. On that occasion, since the cavity piece can be slidably moved by utilizing the metallic mold opening mechanism which has already been provided in the plastic molding metallic mold, it is not necessary to add the new equipment so the molded products can be molded with low cost.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 12a shows a product molded by use of the metallic mold of the first metallic mold embodiment, and FIG. 12b is a cross-sectional view taken along the line A—A of FIG. 12a;

FIG. 16a shows the relationship between the cavity piece forming a part of the metallic mold for attaining the molding method of the fifth embodiment and the molded plastic products molded by the above method, and FIG. 16b shows the structure of the molded plastic products molded by the above method;

FIGS. 17a through 17c are explanatory diagrams showing the procedure of producing the plastic products molded by use of the metallic mold of the fifth metallic mold embodiment shown by the cross section taken along the line g—g of FIG. 16a;

FIGS. 18a and 18b are explanatory diagrams showing a sixth embodiment of the method of producing the molded plastic products according to the present invention; wherein FIG. 18a is an outline view of the metallic mold for attaining the method of producing the molded plastic products, and FIG. 18b is cross-sectional view taken along the line h—h of FIG. 18a;

FIG. 20a is an outline cross-sectional view of the metallic mold for attaining the method of molding the molded plastic products, and FIG. 20b is an outline cross-sectional view of the metallic mold at the time of forming the air gap.

DESCRIPTION OF THE PREFERRED EMBODIMENTS

Figure 1:
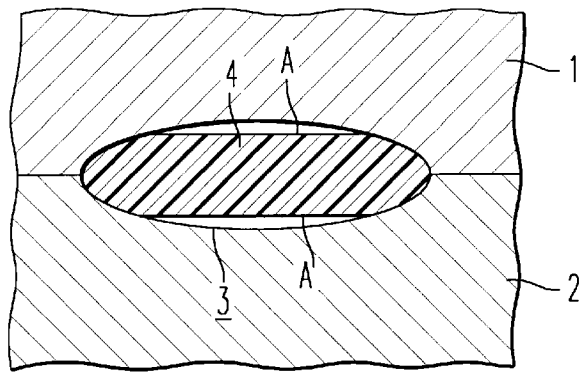
FIG. 1 is an explanatory diagram showing a general (prior-art) method of injecting and molding resin.
Figure 2A:
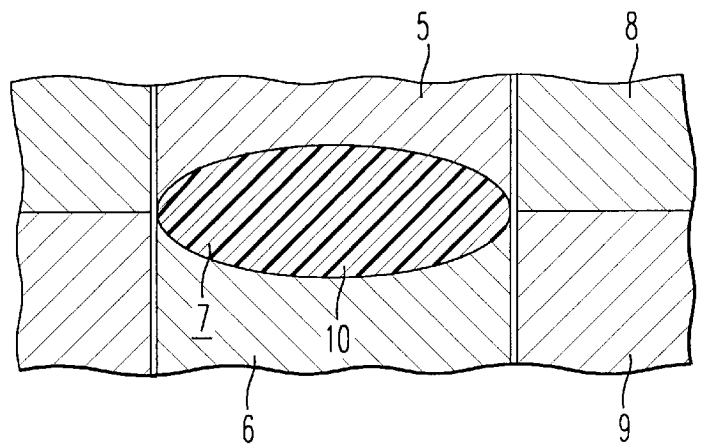
FIGS. 2a and 2b are explanatory diagrams showing general (prior-art) methods of molding the resin by injecting and compressing the resin.
Figure 2B:
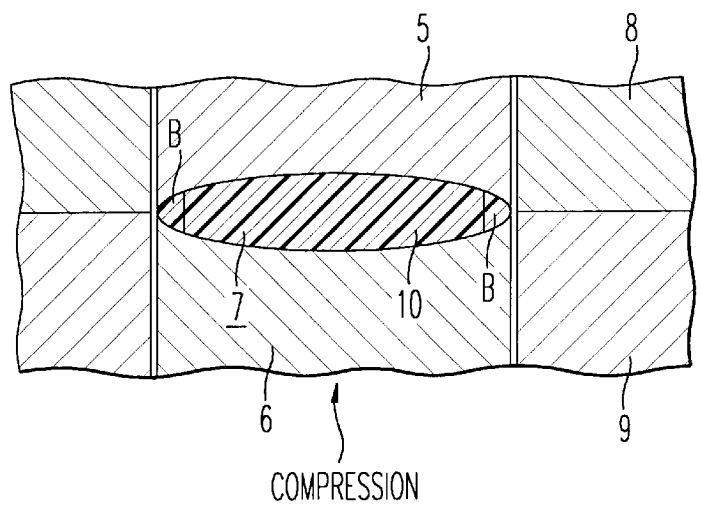

The concrete embodiments of the present invention are described hereinafter, referring to the drawings. In the embodiment(s) of the present invention the occurrence of the limitations associated with the above-described conventional methods and apparatuses is prevented so that molded plastic products of high accuracy can be provided. The embodiments of the present invention are described in order hereinafter, referring to the accompanying drawings.

First Embodiment

Figure 3A:
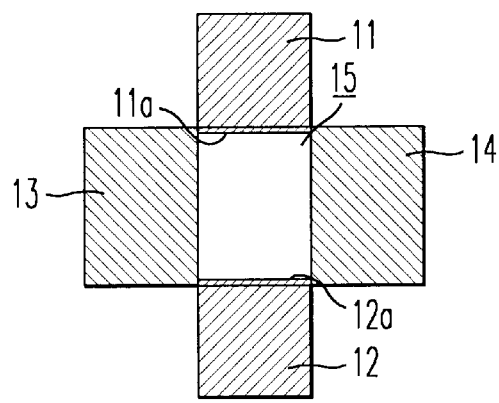
FIGS. 3a through 3c are explanatory diagrams showing a first embodiment of the present invention, FIG. 3a showing a structure of a metallic mold employed in the molding method, FIG. 3b showing fused resin injected into the metallic mold, and FIG. 3c showing a state of forming an air gap therein.
Figure 3B:
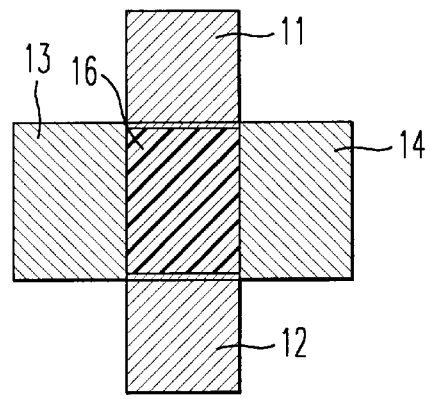
Figure 3C:
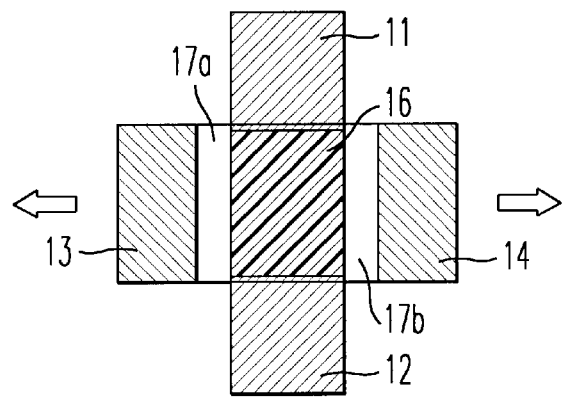
Figure 17A:
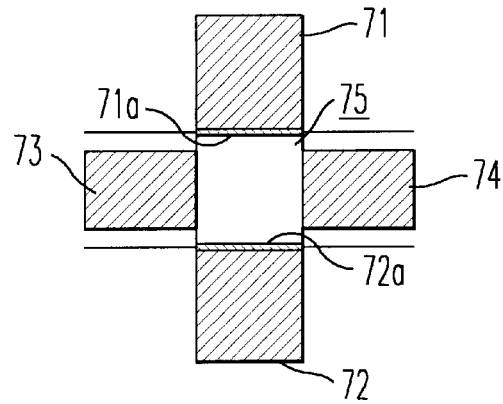
Figure 17B:
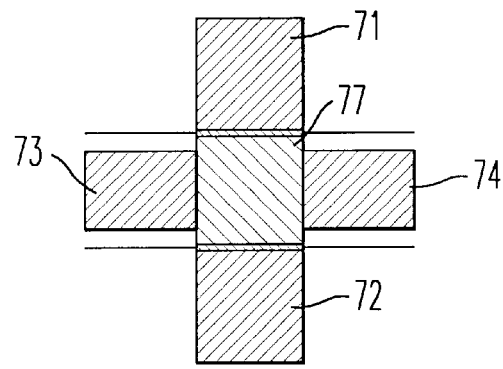

FIGS. 3a through 3c are explanatory diagrams showing a first embodiment of the method of producing the molded plastic products according to the present invention. First, a structure thereof is explained. In FIG. 3a, the reference numerals 11 and 12 represent cavity pieces having transferring surfaces 11a and 12a, while 13 and 14 are other cavity pieces not having the above-mentioned transferring surfaces. A cavity 15 is formed by the cavity pieces 11–14. The cavity piece 11 is fixedly mounted on a metallic mold and the cavity piece 12 is fixedly mounted on another metallic mold. The other cavity pieces 13 and 14 are slidably mounted on the other (latter) metallic mold. Moreover, it is also allowable that each of the cavity pieces 11–14 has a structure such that the cavity pieces 11–14 are mounted on a pair of metallic molds by plural pieces so as to form plural cavities. In FIGS. 3b and 3c, the reference numeral 16 represents resin, and in FIGS. 3c, 17a and 17b represent an air gap.

Next, the function of the above elements is explained. At first, the temperature of the metallic mold is kept to a temperature lower than the softening temperature of the resin by heating the metallic mold as shown in FIG. 3a. The fused resin heated at the temperature equal to or higher than the softening temperature of the resin is injected into the cavity 15 and the cavity 15 is filled with the fused resin. Next, the resin pressure is generated on the transferring surfaces 11a and 12a of the cavity pieces 11 and 12, and then the metallic mold is cooled.

The resin 11 when inserted at the fusing temperature starts to be sharply cooled and solidify from the tip end portion (i.e., the thin structure in the case where the cavity having an unbalanced thickness structure and thick structure is used). As the solidification of the resin progresses, the remaining pressure remains at the tip end portion. However, the temperature on the center portion has been yet reached, or is even higher than, the softening temperature of the resin.

Under the present circumstances, only the cavity pieces 13 and 14 are slidably moved in both directions, as shown by the arrows, and air gaps 17a and 17b are formed between the resin and the cavities 14 and 15. (Refer to FIG. 3c.). In such a manner, the resin inner pressure generated in the cavity 15 can be released by the air gaps 17a and 17b.

At this time, needless to mention, the remaining pressure at the tip end portion, that is, the resin inner pressure is released by the deformation of the tip end portion of the resin, and only the resin inner pressure is equal to or higher than the atmospheric pressure based on viscosity/elasticity of the resin exerted on the transferring surface.

Although the cooling of the resin progresses, since the resin 16 portion brought into contact with the air gaps 17a and 17b comes into contact with the gas or atmosphere, the heat (thermal) conduction from this surface is obstructed, and the temperature of this resin 16 portion becomes higher than that of the transferring surfaces 11a and 12a. Furthermore, since the resin can move freely, the resin inner pressure remains, and further the resin 16 portion contracts with higher priority than that of the portion brought into close adhesion with the cavity pieces 11 and 12 in order to keep (maintain) the closely-adhering force of the resin 16 to the cavity pieces 11 and 12.

In such a manner, according to the first embodiment of the present invention when the fused resin is cooled to a temperature lower than the softening temperature of the resin, the cavity piece 13 and 14 are slidably moved so as to part the cavity piece from the resin, and thereby, since the air gaps 17a and 17b are forcibly formed between the resin 16 and the cavity pieces 13 and 14, the contraction of the resin occurring by cooling is absorbed (extinguished) by moving the resin facing the air gaps 17a and 17b, and the resin portions facing the air gaps 17a and 17b are contracted and deformed with higher priority. Thereby, it is possible to prevent the occurrence of the shrinkage on the transferring surface. Consequently, the desired transferring surface can be faithfully transferred with short molding cycle.

Furthermore, since the resin inner pressure exerted on the transferring surface at the time of cooling can be approximated to be the same as the atmospheric pressure, it is possible to obtain the molded plastic products of small optical elasticity distortion.

Moreover, the reason why the temperature of the metallic mold is set to a temperature lower than the softening temperature of the resin is that, if the temperature of the metallic mold is equal to or higher than the softening temperature of the resin, the molded plastic products is deformed at the time of removing the molded plastic products and so the molded plastic products of high accuracy cannot be obtained.

Second Embodiment

Figure 4A:
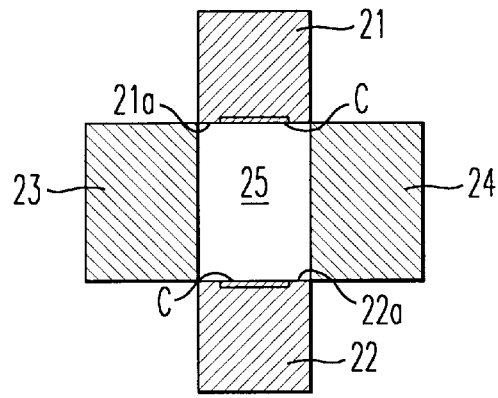
FIGS. 4a through 4c are explanatory diagrams showing a second embodiment of the present invention, FIG. 4a showing a structure of a metallic mold, FIG. 4b showing fused resin injected into the metallic mold, and FIG. 4c showing a state of forming an air gap therein.
Figure 4B:
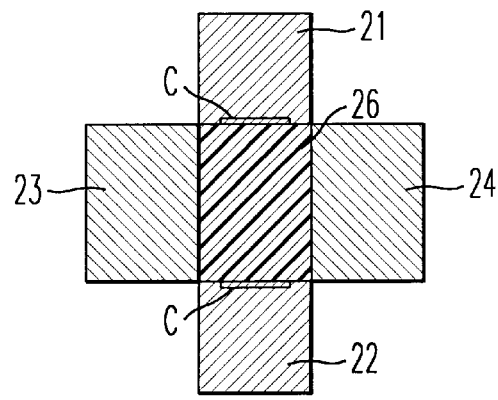
Figure 4C:
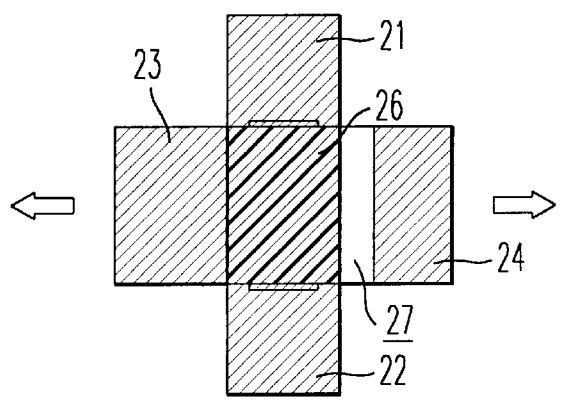
Figure 5:
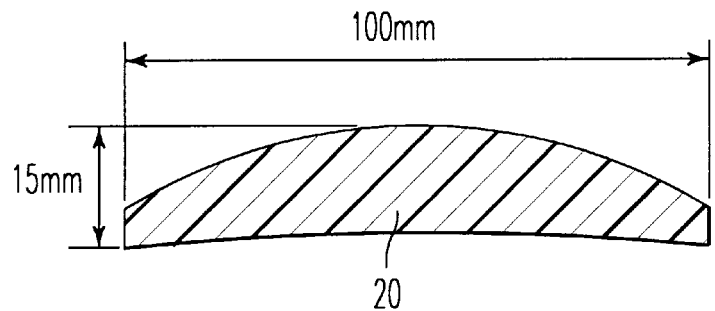
FIG. 5 is a diagram showing plastic product molded by a metallic mold according to a second embodiment of the present invention.

FIG. 4 (FIGS. 4a through 4c) and FIG. 5 are explanatory diagrams showing a second embodiment of the method of producing the molded plastic products according to the present invention. In FIG. 4, the reference numerals 21 and 22 represent cavity pieces having transferring surfaces formed thereon, 23 and 24 cavity pieces have no transferring surfaces. The transferring surfaces 21a and 22a are composed of a pair of convex mirror surfaces having widths of about 10 mm formed on the cavity pieces 21 and 22. A cavity 25 having an effective area of about 6 mm in width at the center portion of the transferring surfaces 21a and 22a, a width of about 10 mm, a height at the center portion thereof at about 15 mm, and the length of 100 mm is formed by the respective cavity piece 21–24. For this reason, as shown in FIG. 5, the molded plastic products 20 having same shape as that of the cavity 25 can be molded, as shown in FIG. 5. Moreover, the transferring surfaces 21a and 22a are formed with the surface accuracy of 0.4 μm.

Furthermore, the cavity piece 24 is composed of porous material, and nitrogen gas is fed into the cavity 25 through fine holes. The cavity piece 21 is fixedly mounted on a metallic mold, while the cavity pieces 22 and 23 are fixedly mounted on another metallic mold, and the cavity piece 24 is slidably mounted on the same (another) metallic mold. Moreover, it is also allowable that each of the cavity pieces 21–24 has a structure such that the cavity pieces 21–24 are mounted on a pair of metallic molds by plural pieces so as to form plural cavities.

In FIGS. 4b and 4c, the reference numeral 26 represents the resin composed of polycarbonate (non-crystal resin). In FIG. 4c, 27 represents an air gap.

The function of the metallic mold is now explained. After keeping the temperature of the metallic mold to a temperature 142° C., which is glass critical point temperature (softening temperature) of the resin as shown in FIG. 4a, the fused resin is injected into the cavity 25 so as to fill the cavity 25 with the fused resin as shown in FIG. 4b. Next, if the gate is solidified, the surface layer portion of the resin 26 is also solidified, the average temperature of the area from the surface layer portion to the center portion turns out to be equal to or higher than the glass critical point temperature of the resin 26, and the resin inner pressure becomes 5 MPa at the center portion of a thick structure. At this time, the cavity piece 25 is slidably moved in a direction as shown by an arrow (FIG. 4c) and an air gap 27 is generated by feeding the nitrogen gas toward the resin 26 through the fine hole of the cavity piece 24 (Refer to FIG. 4c). The inner pressure in the air gap 27 is set to 0.3 MPa.

In such a situation, the pressure of the transferring surfaces 21a and 22a after forming the air gap 27 becomes 0.8 MPa at the center portion thereof. Moreover, the surface for forming the air gap 27 is established (formed) on the surface that is parted by at least 1 mm from the effective area of the transferring surfaces 21a and 22a.

In the present embodiment, the temperatures of the respective parts of the resin 26 are previously analyzed, and thereby it is possible to indirectly detect whether the temperatures of the respective parts become equal to the desired temperature, after a predetermined time period elapses from the time point of injecting the fused resin into the cavity 25 and filling the cavity 25 with the resin.

Next, the metallic mold is cooled to a temperature not higher is than the glass critical point temperature of the resin and the resin 27 is completely solidified. Thereafter, the metallic mold is opened so as not to deform the molded plastic products and the molded plastic products are removed from the cavity 25. As the result, the obtained molded plastic products has a surface accuracy of 0.6 μm in an effective area thereof.

In such manner, according to the present embodiment, when the fused resin is cooled to a temperature not higher than the glass critical point temperature, the resin is slidably moved so as to part the resin from the cavity piece 24, and thereby the air gap is forcibly formed between the resin 26 and the cavity piece 24. Consequently, the same effect as that of the first embodiment is obtained.

Furthermore, since the time point of starting the operation of slidably moving the cavity piece 24 and thereby forming the air gap 27 is set to that when the temperature in the center portion of the resin 26 is equal to or higher than the glass critical point temperature thereof, and the average temperature in the area of the resin from the surface layer portion to the center portion is equal to or higher than the glass critical point temperature of the resin in the state that the temperature on the surface layer potion of the resin 26 in the cavity 25 is lower than the glass critical point temperature thereof and the resin 26 is solidified, the surface for creating the air gap 27 and the resin are brought into close contact with each other when it is desired to form the air gap 27 at the time of cooling. However, since the surface layer of the resin is in a state of being solidified, the peeling off of the resin can be easily done, and in addition, the surface layer of the resin at the time of peeling off can be prevented from being largely deformed.

Furthermore, since the average temperature of the resin is equal to or higher than the glass critical point temperature thereof after forming the air gap 27 by peeling off the resin, the temperature of the resin portion can be, conversely, raised to a temperature equal to or higher than the glass critical point temperature and thereby the viscosity of the resin can be made low. Therefore, the moving of the resin portion can be easily done. Since the pressure in the air gap 27 is set to 0.3 MPa, a constant pressure can be generated so as to accelerate (promote) the contraction movement of the resin portion facing the air gap 27 at the time of cooling the resin 26.

It is preferable to set the pressure in the air gap to a value in the range of 0.05 MPa~6 MPa. The reason is that if the pressure in the air gap 27 is lower than 0.05 MPa, the effect of the acceleration cannot be obtained, while, if the pressure in the air gap 27 is equal to or higher than 6 MPa, a high-cost pressure generating apparatus has to be prepared. In addition, the distortion due to the pressure generation remaining in the molded plastic products exerts an undesirable effect on the molded plastic products. Moreover, as to the most preferable pressure, it is ideal to set the pressure to a value in the range of 0.1 MPa~2 MPa.

As to the pressure of the transferring surface immediately before forming the air gap 27 by slidably moving the cavity piece 24, if the pressure is set to a value within the range from 0.5 MPa to 60 MPa, the transferring property on the transferring surface at the time of generating (forming) the air gap can be prevented from being lowered. So in case that the pressure on the transferring surface is set to a value lower than 0.5 MPa, there occurs an unfavorable phenomenon that the transferring surface is peeled off when the air gap 27 is formed. Moreover, in case that the pressure on the transferring surface is set to a value not less than 60 MPa, there occurs another unfavorable phenomenon in that the inner stress of the molded plastic product itself increases and thereby the remaining stress remains therein.

Furthermore, a porous material is employed as the cavity piece 24 and nitrogen gas is fed into the resin side through the fine hole of the cavity piece 24, and the cavity piece 24 is slidably moved in order to form the air gap 27. Consequently, the property of slidably moving the cavity piece 24 can be improved, and in addition, the peeling-off between the cavity surface for forming the air gap 27 and the resin 26 can be easily done, and the ease with which the molding operation is performed improves.

Since the non-crystal resin having the softening temperature being equal to the glass critical point temperature is employed and the contracting property is preferable, the molding accuracy can be easily obtained with high accuracy.

Likewise, since the surface for forming the air gap 27 is parted by at least more than 1 mm from the effective area of the transferring surfaces 21a and 22a, it is possible to prevent the resin portions 26 from coming into contact with the air gap and being deformed unnecessarily, and so no undesirable influence is exerted on the molded plastic products.

Although it may be allowed to feed the air into the cavity 25, in the present embodiment, since the nitrogen gas is fed into the cavity 25, the resin 26 is prevented from being deteriorated. Furthermore, although the porous material is employed as the cavity piece 24, it may be also allowed to employ the other structure which can feed the gas into the cavity through the cavity piece and does not close (shut) up the hole when the hole is filled with the fused resin.

Although polycarbonate is employed as the resin, other non-crystal resins such as polystyrene, polymethyl methacrylate, amorphous polyolefin, Geonex made by Nippon Geon, Apel made by Mitsui Sekiyu Kagaku, etc. may be used.

Third Embodiment

Figure 6:
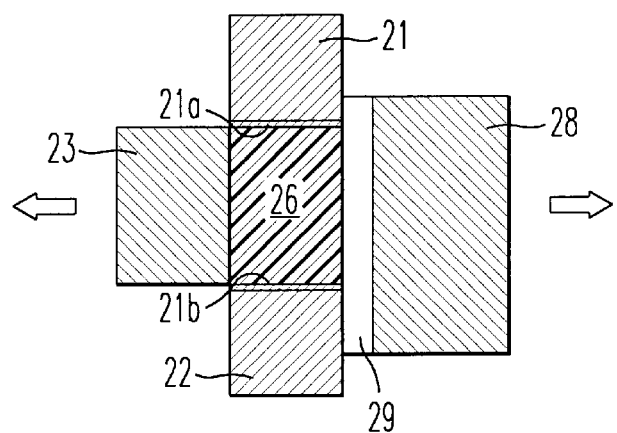
FIG. 6 is an explanatory diagram showing a third embodiment of the method of the present invention, in which an air gap is formed.

FIG. 6 is an explanatory diagram showing a third embodiment of the present invention, in which the air gap is formed, and in which same reference numerals are attached to the same structure (element) as that of the second embodiment and the explanation thereof is omitted.

In the present embodiment, as shown in FIG. 6, the cavity piece 28 is brought into contact with the surface adjacent to the transferring surfaces 21a and 22a, and the cavity piece 28 is slidably moved in a direction shown by an arrow. At this time, air gap 29 is formed also on the surface adjacent to the transferring surface 21a and 22a. Consequently, when the resin cools and contracts, the resin facing the air gap 29 can be further easily contracted by cooling, and thereby the transferring accuracy of the transferring surfaces 21a and 22a is improved such that the entire surface adjacent to the transferring surfaces 21a and 22a can be released.

Fourth Embodiment

Figure 7:
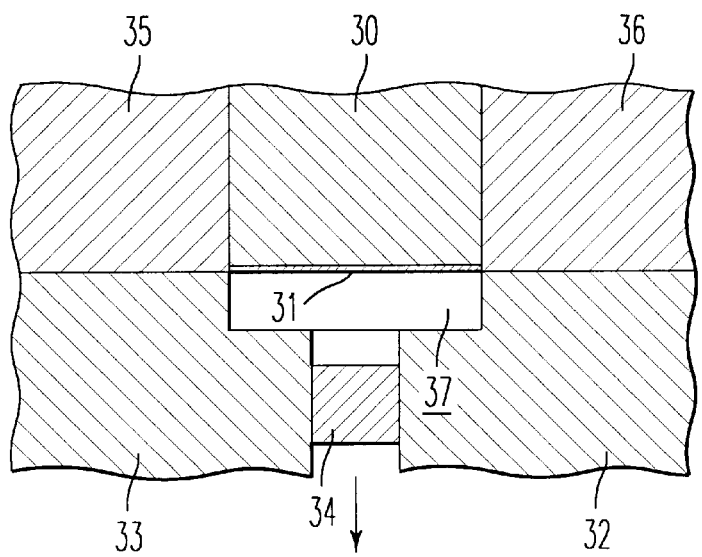
FIG. 7 in a cross-sectional view of a fourth embodiment of the present invention, in which a structure of the metallic mold is shown.

FIG. 7 is an explanatory diagram (cross-sectional view) showing a fourth embodiment of the present invention, in which a structure of the metallic mold is shown. In this embodiment, an explanation is omitted for elements common with the second embodiment.

In the present embodiment, a mirror is employed as one transferring surface 31. The slidably-moving cavity piece 34 is situated on a surface opposing to the transferring surface 31 of the cavity piece 30, and the cavity piece 37 is formed by the cavity pieces 30, 32, 33 and 34 of the metallic mold. The present embodiment adopts the structure in which the cavity pieces 32 and 33 are not slidably moved even in case that the cavity piece 34 is slidably moved in a direction shown by the arrow.

Even in such case as mentioned above, it is possible to obtain same effect as that of the first embodiment.

Fifth Embodiment (Metallic Mold)

Figure 8:
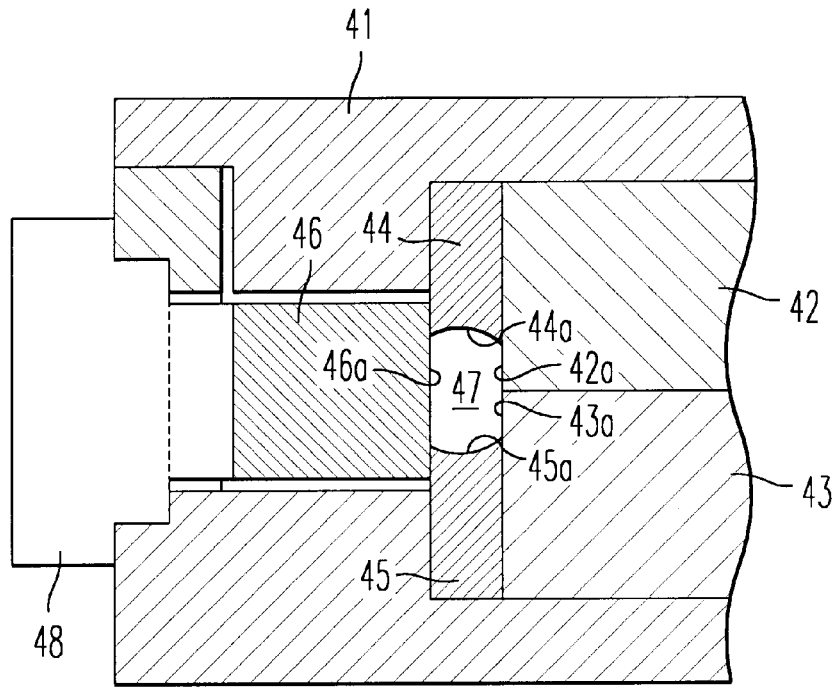
FIG. 8 is a cross-sectional view showing a first metallic mold embodiment for molding the molded plastic products according to the present invention.
Figure 9:
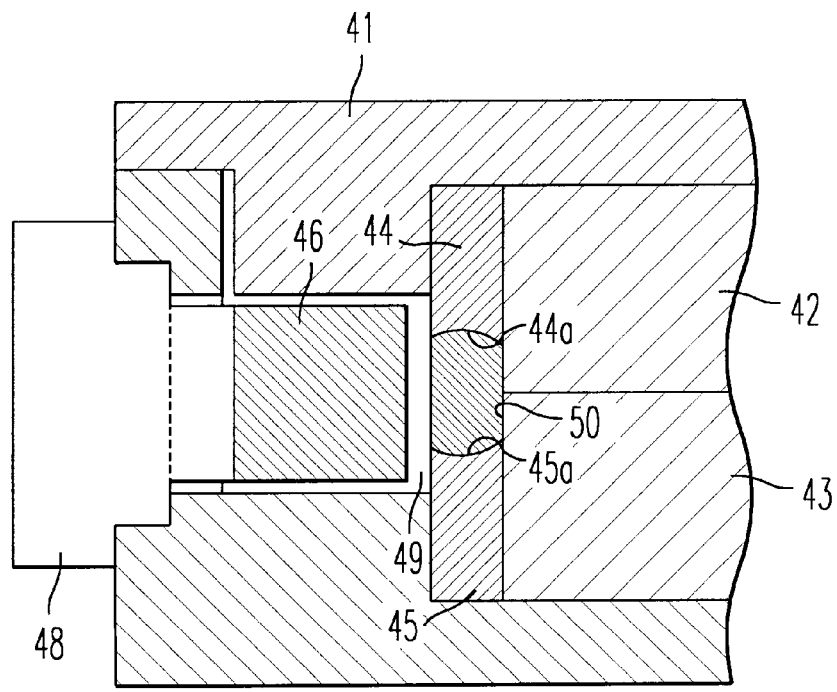
FIG. 9 is a cross-sectional view showing a state of parting a cavity piece of a first metallic mold embodiment from the resin and thereby forming the air gap between the cavity piece and the resin.
Figure 10:
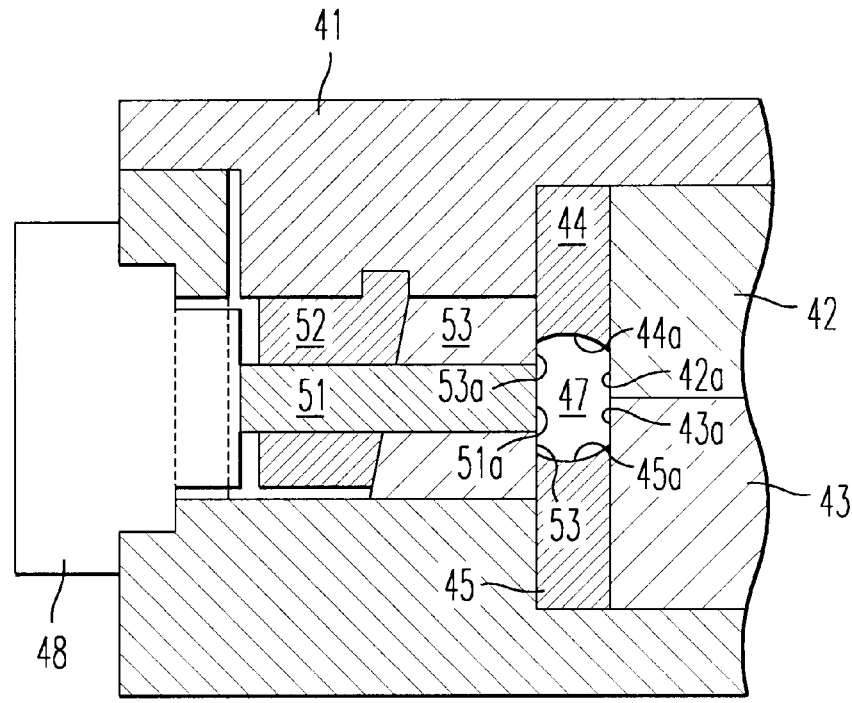
FIG. 10 is a cross-sectional view of a modification of the first metallic mold embodiment.

FIGS. 8 through 10 are cross-sectional views showing a fifth embodiment of the present invention, which is a first metallic mold embodiment used for molding the molded plastic products according to the present invention.

A structure of the mold is first explained in reference to FIG. 8, where the reference numeral 41 represents a fixing metallic mold. A pair of movable metallic molds 42 and 43 having molding surfaces 42a and 43a respectively formed at the tip end portion thereof, are slidably provided in the fixing metallic mold 43. Mirror surface pieces 45 and 46 having mirror surfaces (transferring surfaces) 44a and 45a respectively formed at the tip end portion thereof, are provided between the fixing metallic mold 41 and the movable metallic molds 42 and 43.

A cavity piece 46 having a molding surface 46a at the tip end portion thereof is slidably provided in the interior of the fixing metallic mold 41. A separation wall is constructed with the molding surfaces 42a and 43a of the movable metallic mold, the mirror surfaces 44a and 45a of the mirror surface pieces 44 and 45, and the molding surface 46a of the cavity piece 46. A cavity of a predetermined capacity is formed by the separation wall in the molding metallic mold, as shown. Moreover, in the present embodiment, the transferring surface 46a of the cavity piece 46 constructs the entire wall surface for constructing the cavity 47. A gate (not shown) opening to the cavity 47 is formed on the fixing metallic mold 41. The fused resin is injected into the cavity 47 through the above-mentioned gate and the cavity is filled with the resin.

Furthermore, a pressure control apparatus 48 is provided on the basic end (edge) portion of the cavity piece 46. The pressure control apparatus 48 has an actuator medium composed of an oil-pressure cylinder. The oil-pressure is supplied to one of the oil-pressure cylinder chambers, and thereby the cavity piece 46 is pressurized with a predetermined pressure so as to be urged toward the cavity side. In addition, the oil pressure is supplied to another oil-pressure cylinder chamber, and thereby the cavity piece 46 is can be evacuated (extracted or separated from) from the cavity 47. In such manner, the cavity piece 46 is slidably moved by the pressure control apparatus 48.

A driving medium for the pressure drive apparatus 48 is not limited to the oil-pressure cylinder. Rather, an electrically-driven motor can be used as the pressure drive apparatus, where on this occasion, if a ball screw, etc. is provided on a rotative shaft of the electrically-driven motor and another screw is formed in the cavity piece 44 so as to be in screw engagement with the above ball screw, the same operation as mentioned above can be performed.

A pressure detector, not shown, such as piezoelectric element, etc. is provided in the cavity 47. The piezoelectric element detects the pressure of the resin in the cavity 47 and outputs the signal to a controller, not shown, and the controller controls the pressure control apparatus 48 on the basis of the detected information from the piezoelectric element. In the present embodiment, the pressure control apparatus 48 and the above controller construct the slidably moving medium.

The molding surface 46a of the cavity piece 46 is surface-treated with TiN (cyan nitride), and the slidably moving surface for the fixing metallic surface 41 of the cavity piece 46 is surface-treated with the same material. This material is selected due to its durability (wear and tear) property, although other materials with similar properties may be employed, such as TiCN (titanium cyanide), W2C (tungsten carbide), and Teflon resins, etc.

In FIG. 9, the resin 50 is shown to fill the cavity 47 (FIG. 8).

Next, the functional operation of the metallic mold according to the present embodiment is explained.

After heating the metallic mold to a temperature lower than the softening temperature of the resin, the cavity piece 46 is pressurized by the pressure control apparatus 48 as shown in FIG. 8. The pressurizing pressure at this time is set to a pressure higher than the resin pressure at the time of injecting the fused resin into the cavity 47 in order to fill the cavity 47 with the resin.

Next, the fused resin is injected into the cavity 47 through the gate, and the resin pressure is generated on the mirror surfaces 44a and 45a of the mirror surface pieces 44 and 45, and then the metallic mold is cooled.

When filling the cavity, in the case of unbalanced-structure and thick structure, the resin temperature is such that the resin is in a state fusing state and begins to solidify from the tip end portion (thin structure portion). Even though the solidifying of the resin progresses and the remaining pressure is remains at the tip end portion thereof, the temperature of the center portion thereof is equal to or higher than the softening temperature of the resin.

When it is detected by the piezoelectric element that the pressure of the resin turns out to be a predetermined pressure set in a range of 0.5 MPa~60 MPa, the pressure control apparatus 48 is put in operation such that the cavity piece 46 is moved away (so as to part with) the resin 50. Thereby, as shown in FIG. 9, an air gap 49 is formed between the resin 50 and the molding surface 46a.

For this reason, the resin inner pressure generated in the cavity 47 is released by the air gap 49. At this time, needless to mention, the remaining pressure at the tip and portion thereof, that is, the resin inner pressure is also released due to the deformation of the resin's tip end portion, and thereby only the resin inner pressure not lower than the atmospheric pressure and based on the viscosity/elasticity of the resin 50 is exerted on the transferring surface.

Thereafter, the cooling of the resin 50 progresses. However, since the resin portion brought into contact with the air gap 49 comes into contact with the gas (atmospheric environment), the thermal conduction from this surface is obstructed and the resin portion remains at a high-temperature for the mirror surfaces 44a and 45a when cooling. Furthermore, since the resin portion can move freely, the resin inner pressure remains present, and the resin portion contracts or expands with higher priority than that of the portion closely adjacent to the cavity pieces 46. Thereby, the concave portion or the convex portion is selectively formed and the closely-attaching force of the resin to the mirror surfaces 44a and 45a is maintained.

Accordingly, the cavity piece 46 for defining the molding surface 46a excluding the mirror surfaces 44a and 45a is slidably provided so that when the resin pressure turns out to be a pressure set in the range of 0.5 MPa to 60 MPa, the cavity piece 46 is slidably moved so as separate from the resin 50. Consequently, since the air gap 49 is forcibly formed between the resin 50 and the cavity piece 46, and adequate resin inner pressure is generated in the cavity 47 by the action of injection/filling, the resin 50 is brought into close contact with the mirror surfaces 44a and 45a, and an adequate pressure for maintaining the close contact is achieved in such situation as mentioned above, the resin surface of the resin portion facing the air gap 49 is formed as a free surface, and the surface can move more freely than the surface facing the other molding surfaces 42a and 43a. For this reason, the thermal conduction from the resin portion is lowered by the existence of the air gap 49, and thereby the cooling speed of the resin portion is lowered.

For this reason, the contraction that occurs by the cooling is absorbed by moving the resin portion of this portion, and the resin 50 facing the air gap 49 is shrunk or expanded with high priority. Thus, a concave surface or a convex surface can be selectively formed on the facing surface and the shrinking on the mirror surfaces 44a and 45a can be prevented. As the result, even when molding plastic products of thick structure and unbalanced thick structure, it is possible to obtain molded plastic products with low distortion and that secures the shape accuracy of the transferring surface, even though the molded plastic products are the ones of thick structure or unbalanced thickness structure.

Furthermore, even in case that the temperature of the metallic mold is set to a temperature not higher than the softening temperature of the resin 50, the desirable shape accuracy can be secured. Therefore, the cooling time of the resin 50 can be shortened and the molding time of the molded plastic products can be also shortened. Consequently, the manufacturing cost of the molded plastic products is reduced relative to conventional devices.

Furthermore, since the resin pressure in the cavity 47 at the time of parting the cavity piece 46 from the resin 50 is set to a value in the range of 0.5 MPa~60 MPa, a concave or convex molding surface can be formed selectively on the molding surface of the resin 50 molded by the cavity piece 46. Moreover, when the resin pressure at the time of parting is set to a value lower than 0.5 MPa, the mirror surfaces 44a and 45a are unfavorably peeled off. On the other hand, when the resin pressure at the time of parting is set to a value not lower than 60 MPa, the inner stress of the molded plastic products themselves increases and thereby the remaining stress remains, unpreferably.

Because the cavity piece 46 is pressurized by the pressure-control apparatus 48 so as to make the resin pressure in the cavity 47 not lower than a predetermined pressure, it is possible to prevent the cavity piece 46 from moving in a direction of parting from the resin 50 by the action of the pressure of the resin 50 occurring at the time of injecting/filling of the resin.

Furthermore, since the pressure control apparatus 48 has an actuator medium composed of the oil-pressure cylinder, and the cavity piece 46 is slidably moved by the actuator medium, the structure of the pressure control apparatus 48 can be made simple, and the structure of the metallic mold for use in molding can be also made simple.

Furthermore, since a piezoelectric element for detecting the resin pressure in the cavity 47 is provided in the cavity 47 and a controller for driving the pressure control apparatus 48 on the basis of the detecting information from the piezoelectric element is further provided therein, the resin inner pressure or the movement timing of the cavity piece 46 can be controlled with high accuracy, and the convex or concave surface can be stably formed on the molding surface of the resin 50 facing the air gap 49, thus successively molding the molded plastic products.

Because the molding surface 46a of the cavity piece 46 is surface-treated with TiN, which has a low closely-attaching force with the resin 50, the cavity piece 46 can be easily parted from the resin 50, and the shape accuracy of the mirror surfaces 44a and 45a can be improved relative to that with conventional devices.

Furthermore, since the slidably-moving surface of the cavity piece 46 as well as the molding surface 46a is surface-treated with TiN having a high wear- and tear-proof property, the durability on the slidably-moving surface between the cavity piece 46 and the molding metallic mold for use in molding the resin can be improved, and thereby the life time of the metallic mold for molding the resin can be also improved.

Figure 11:
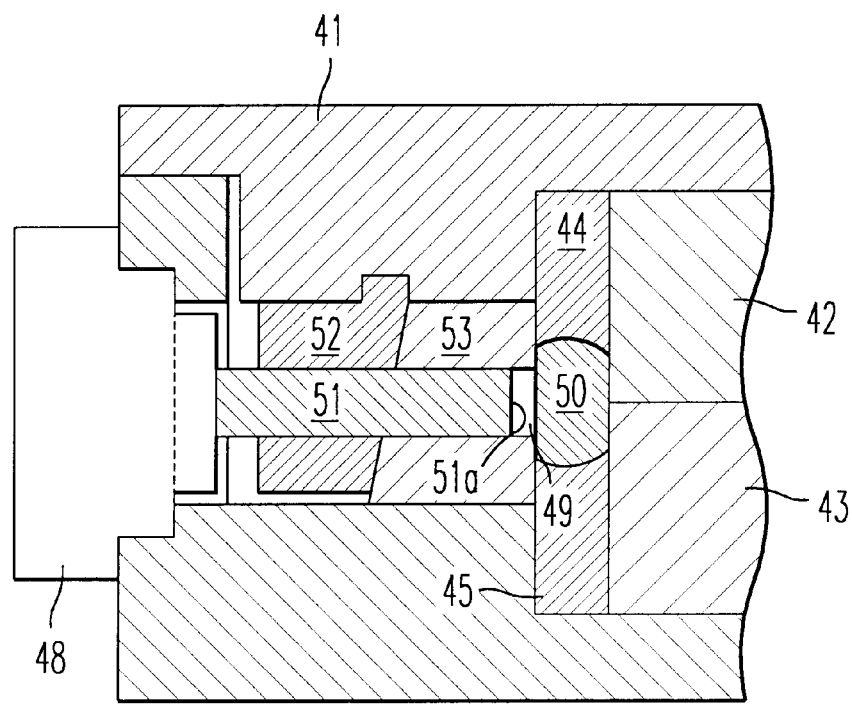
FIG. 11 is a cross-sectional view showing a state of parting the cavity piece of the first metallic mold embodiment shown in FIG. 10 from the resin and forming the air gap between the cavity piece and the resin.

FIG. 10 is a cross-sectional view showing another status (modification) of the first metallic mold embodiment at a state prior to that shown in FIG. 11. Namely, FIG. 11 shows a state in which the resin 50 is injected into the cavity 47 and the cavity piece 51 is moved to the left side, and on the contrary, FIG. 10 shows the other state in which the resin 50 is not yet injected into the cavity 47 and the cavity piece 51 is also not yet moved to the left side.

Figure 12A:
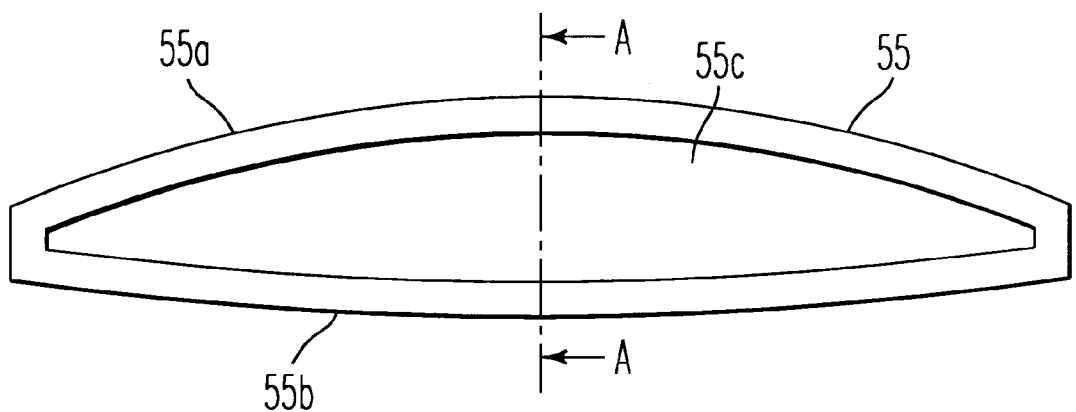
FIGS. 12a and 12b show the structure of the molded plastic products, where
Figure 12B:
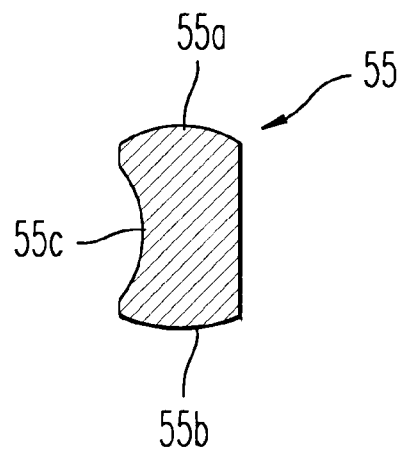

The modification shown in FIG. 10 and FIG. 11 is featured in that the sleeve 52 is provided in comparison with the first metallic mold embodiment shown in FIG. 8 and FIG. 9. Moreover, in the present metallic mold embodiment, the cavity piece 46 for forming all of one molding surface 46a, excluding the mirror surfaces 44a and 45a, is slidably provided. However, the metallic mold embodiment is not limited to the above. As shown in FIGS. 11 and 12, it is allowable to slidably provide a cavity piece 51 for forming a part of one molding surface 51a excluding the mirror surfaces 44a and 45a. On this occasion, it is allowable that a hollow sleeve 52 is provided between the fixing metallic mold 41 and the cavity piece 51, and a hollow inserting piece 53 is further provided therebetween. The cavity piece 51 is slidably moved against-the sleeve 52 and the inserting piece 53. The molding surface of the cavity piece 51 is formed in the wall surface formed so as to include the cavity piece 51, that is, almost similar shape (plain shape) to the molding surface 53a of the inserting piece 53.

In such structure, when the mirror surfaces 44a and 45a is transferred to the resin 50 by the action of the resin pressure occurring in the cavity 47, a plain surface can be formed on the molding surface at the side of the cavity piece 51 of the resin 50. When the cavity piece 51 is parted from the resin 50, as shown in FIG. 12, for instance, a convex surface can be selectively formed over the wide range of the molding surface at the cavity piece (51) side of the molded plastic products 55 such as lens, etc., and the shape accuracy of the mirror surfaces 44a and 45a can be further improved. Moreover, in FIG. 12, the reference numerals 55a and 55b represent the transferred mirror surface, and 55c the molding surface at the side of the cavity piece 51.

Furthermore, the reason why the cavity piece 51 is made in the almost similar shape is that, when the shape of the molding surface 46a is non-spherical, the curvature rate approximation facilitates the mechanical processing of the cavity piece 51. As a matter of course, if NC processing is adopted, since even the non-spherical shape can be easily processed mechanically. When the non-spherical surface is large and the curvature rate approximation causes a large amount of error, it may be preferable to mechanically process the non-spherical shape as it is.

Sixth Embodiment (Second Metallic Mold Embodiment)

Figure 13:
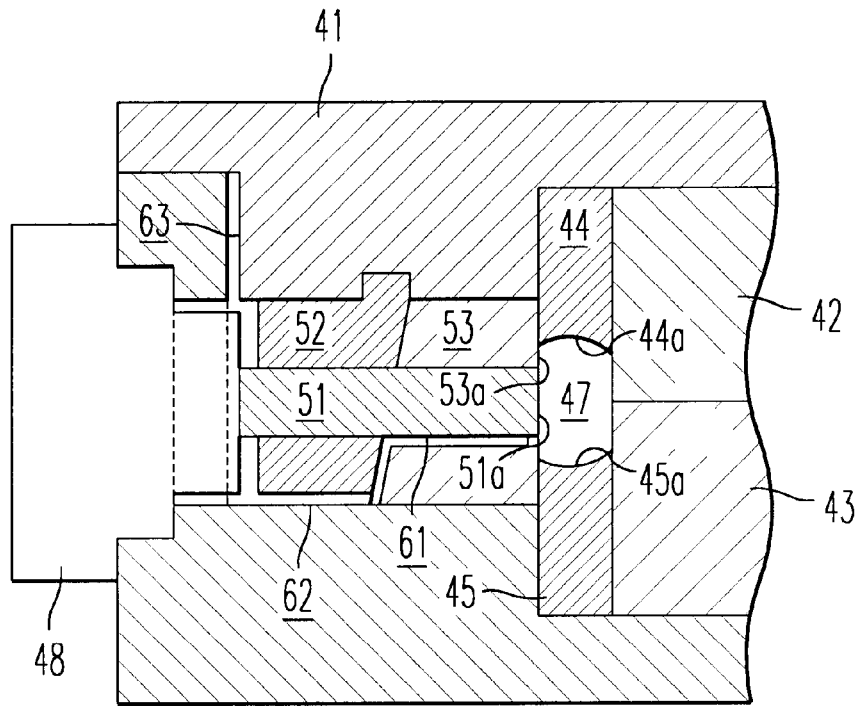
FIG. 13 is a cross-sectional view showing a second metallic mold embodiment for producing the molded plastic products according to the present invention.
Figure 14:
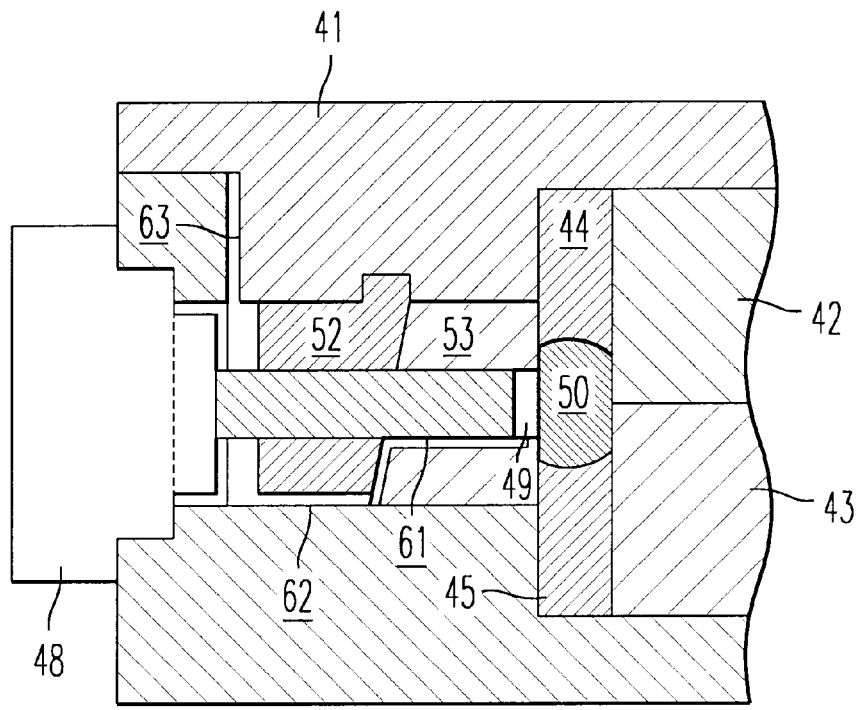
FIG. 14 is a cross-sectional view showing a state of parting the cavity piece of the second metallic mold embodiment from the resin and forming the air gap between the cavity piece and the resin.

FIGS. 13 through 15 are cross-sectional views showing a second metallic mold embodiment for molding the molded plastic products according to the present invention and as shown in FIGS. 13 through 15, where same reference numerals are attached to the same elements as that of the fifth embodiment (first metallic mold embodiment), and the explanation thereof is omitted.

In FIGS. 13 and 14, a vent hole 61 is provided between the cavity piece 51 and the slidably-moving surface of the cavity piece 51. The vent hole 61 communicates with the one end portion of the vent hole 63 formed on the fixing metallic mold 41 through the vent hole 62 formed between the sleeve 52 and the fixing metallic mold 41. The other end portion of the vent hole 63 communicates with the atmospheric air.

Furthermore, as shown in FIG. 14, when the cavity piece 51 separates (i.e., parts) from the resin 50, the vent hole 61 is formed on the position where the tip end portion of the cavity piece 51 communicates with the air gap 49 formed between the resin 50 and the cavity piece 51. The vent hole 61 causes the air gap 49 and the exterior of the metallic mold to communicate with each other, when the cavity piece 51 slidably separates from the resin 50 in the present metallic mold embodiment, by forming the vent holes 61–63, when the cavity piece 51 moves so as to part from the resin 50, the air is surely fed from the exterior into the air gap between the cavity piece 51 and the resin 50. Thereby, the pressure in the air gap 49 can equalize with the atmospheric pressure, and the cavity piece 51 can be rapidly parted from the resin 50. As a result, the concave or convex surface can be stably formed, and thereby the shape accuracy of the mirror surfaces 44a and 45a can be improved.

Furthermore, in the present metallic mold embodiment, since there is a possibility that the air goes around into the air gap 49 between the cavity piece 51 and mirror surfaces 44a and 45a. In such manner, it is possible to prevent the air from going around and into the air gap 49 between the cavity piece 51 and the resin 50 through the vent hole. Consequently, the shape accuracy of the molded plastic products can be also prevented from becoming deteriorated.

Figure 15A:
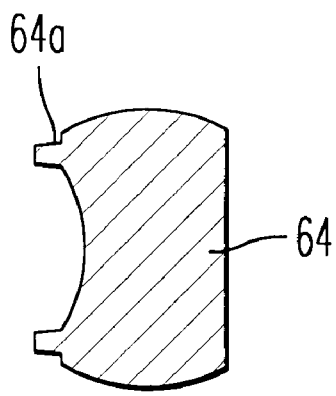
FIGS. 15a through 15c are structural diagrams respectively showing the plastic products molded by the metallic mold of the other status of the second metallic mold embodiment.
Figure 15B:
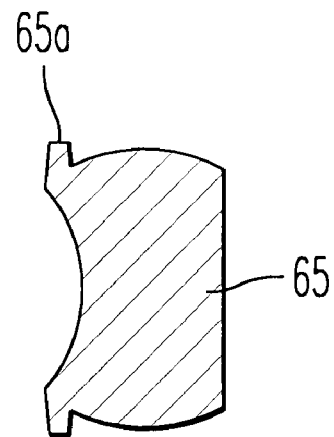
Figure 15C:
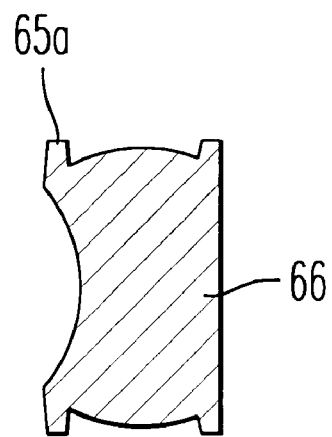

Examples of the plastic products molded in such way are shown in FIGS. 15a through 15c. In the respective figures, the reference numerals 64 through 66 are the molded plastic product such as lens, etc., and the parts shown by 64a, 65a, and 66a are, respectively, step portions (projecting portions) formed by the step.

Seventh Embodiment

FIGS. 16 and 17 are explanatory diagrams showing a seventh embodiment of molding the plastic molded plastic products according to the present invention.

Figure 16A:
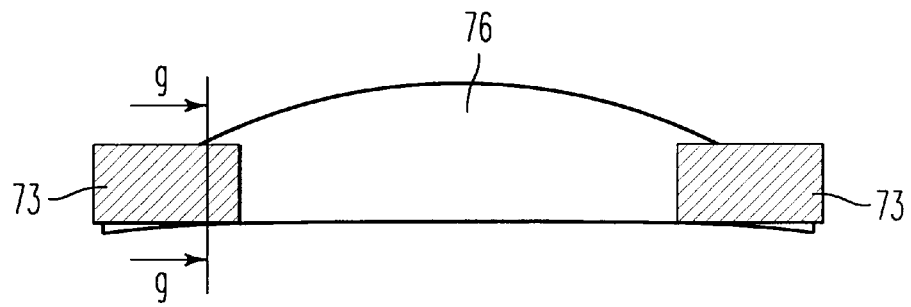
FIGS. 16a and 16b are explanatory diagrams showing a fifth embodiment of the method of producing the molded plastic products according to the present invention, where
Figure 16B:
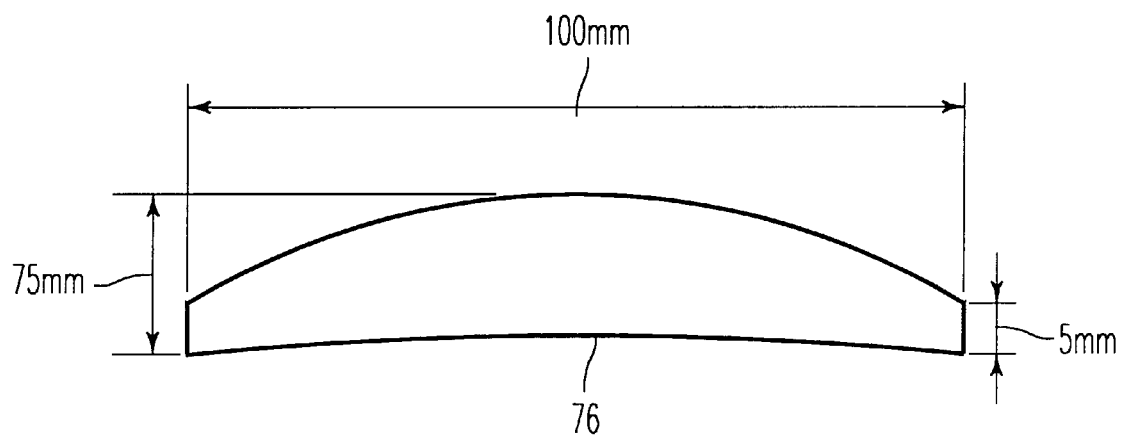

FIG. 16a is an explanatory diagram illustrating the relationship between the cavity piece constructing a part of the metallic mold for attaining the molding method of the present embodiment and the products molded thereby. FIG. 16b is another explanatory diagram showing the structure of the molded plastic products molded by the present method.

Figure 17C:
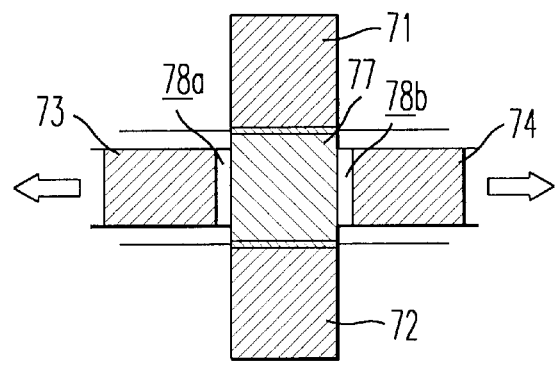

FIGS. 17a through 17c are explanatory diagrams showing the procedure of molding the plastic molded plastic products by use of the metallic mold of the seventh embodiment shown by the cross section taken along the line g—g of FIG. 16a. FIG. 16b shows the example of obtaining the shape of the long lens having length of 100 mm, center portion thickness of 15 mm, end portion thickness of 5 mm, and width of 10 mm, and further having a transferring mirror surface in the thickness direction.

At first, the structure of the embodiment is explained. In FIGS. 16 and 17, the reference numerals 71 and 72 represent each cavity piece having the transferring surface 71a or 72a. The cavity pieces 71 and 72, which are respectively provided in the upper side and the lower side and expand in the longitudinal direction of the molded plastic products 76. In order to obtain the surface accuracy of the transferring surfaces 71a and 72a, PV 0.4 µm is employed.

The reference numerals 73 and 74 identify the cavity pieces that have no transferring surface and are provided on the thin structure portion at the both end portions of the molded plastic products 76 so as to slidably move in the upper or lower metallic mold. A cavity piece having no molding surface to be formed thereon is fixed on the upper or lower metallic mold opposing to the side surface of the molded plastic products 76, excluding the cavity pieces 73 and 74.

A cavity 75 is formed by the cavity pieces 71–74 and the upper and lower metallic molds for holding the cavity pieces 71–74. Moreover, it may be allowed to adopt a structure which the respective plural cavity pieces 71–74 are provided on a pair of metallic molds so as to form plural cavities.

Moreover, in FIGS. 17b and 17c, the reference numeral 77 represents the resin and in FIG. 17c, the reference numerals 78a and 78b represent the air gaps.

Next, the functional operation of the present embodiment is explained.

At first, polycarbonate which is a non-crystal resin is prepared, as the resin of the embodiment. Then, as shown in FIG. 17a, the temperature of the heated metallic mold is kept at 142° C. which is a temperature lower than the softening temperature of the resin (in the case of employing the non-crystal resin, a temperature lower than the glass critical point temperature). Next, as shown in FIG. 17b, the fused resin 77 at a temperature of 300° C. is injected into the cavity 75 of the metallic mold in order to fill the cavity with the resin.

Since the cavity 75 has a thick structure, a thick unbalanced structure, having a same capacity as the shape of the molded plastic products 76, the resin 77 is sharply cooled and solidified with priority from the thin structure part of the end portion thereof and the surface layer portion thereof.

After injecting the resin 77 and filling the cavity therewith, the cavity pieces 73 and 74 are slidably moved, and the same are parted from the both ends of the resin 77 without moving the cavity pieces 71 and 72, as shown in FIG. 17c, 40 seconds after the controlled pressure is generated. At this time, air gaps 78a and 78b are formed between the cavity pieces 73 and 74 and the resin 77. At this time, the resin inner pressure generated in the cavity 75 is released by the air gaps 78a and 78b. As a matter of course, the shape of the end portion of the resin 77 is temporarily changed to a convex shape, and thereby only the resin pressure higher than the atmospheric pressure and based on the viscosity/elasticity of the resin at that time is exerted on the transferring surface.

Thereafter, the resin 77 is further gradually cooled. However, since the resin 77 of the air gap forming surface is brought into contact with the adiabatic (heat insulating) gas, the heat conduction from the surface is obstructed. The exposed surface is brought into contact with those air gaps 78a and 78b retains a high-temperature (compared with) the transferring surface at the time of cooling and can move freely. Therefore, until the surface is cooled to a temperature almost equal to the thermal deformation temperature not higher than the softening temperature of the resin, a slight resin pressure occurs and the resin contracts with priority from the transferring surface having the adhesive sticking force with the cavity pieces 73 and 74.

Next, the resin 77 is completely solidified, and the metallic mold is opened and the molded plastic products 76 is taken out from the metallic mold such that the molded plastic products 76 are not deformed at 142° C.

In this way, in the present embodiment, the surface which is not the transferring surface of the part, corresponding to the thin structure portion that rapidly solidifies next to the air gaps 78a and 78b (with priority and with a timing that enables a free surface movement) and thereby both of the increasing of the internal distortion and the lowering of the transferring property can be prevented.

Moreover, in the present embodiment, although the cavity pieces 73 and 74 have a structure that forms the air gaps 78a and 78b between a part of one surface excluding the transferring surface and the resin 77, it is also allowable that other air gaps are formed for other surfaces, excluding the transferring surface and the resin 77.

Eighth Embodiment

Figure 18A:
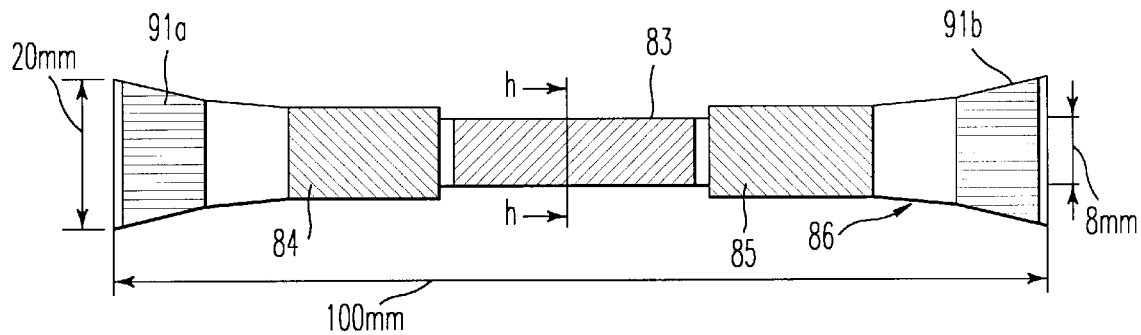
Figure 18B:
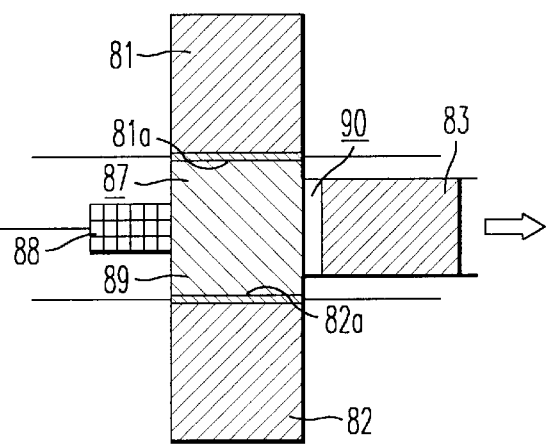

FIG. 18 shows an eighth embodiment of the present invention. FIG. 18a is an outlined view showing the metallic mold used in the method for molding the plastic products, and FIG. 18b is a cross-sectional view taken along the line h—h of FIG. 18a.

At first, the structure of the embodiment is explained. The reference numerals 81 and 82 identify the cavity pieces respectively having the transferring surfaces 81a and 82a. The cavity pieces 81 and 82 are respectively provided (mounted) on the upper mold and the lower mold and extend in a longitudinal direction of the molded plastic products 86. In order to obtain the surface accuracy of the transferring surfaces 81a and 82a, PV 0.7 µm is employed.

Furthermore, the reference numerals 83, 84, and 85 represent cavity pieces having no transferring surface to be formed thereon. Those cavity pieces 83, 84, and 85 are provided along one side surface in the longitudinal direction of the molded plastic products 86 and those pieces can respectively slidably move along the upper metallic mold and the lower metallic mold.

The cavity 87 is formed by the upper and lower metallic molds constructing the other surfaces of the cavity pieces 81~85.

Furthermore, the shape of the cavity 87 is longitudinal, having a width of 10 mm, a center thickness of 8 mm, end portion thickness of 20 mm, and length of 100 mm, on condition that the width 4 mm of the center portion on the transferring surface is the effective area. The cavity piece 83 is provided so as to slidably move on a position that opposes the thin structure portion (the portion of the center thickness 8 mm) of the molded plastic products 86 at the center portion of the cavity 87. The cavity pieces 83 and 84 are provided so as to slidably move on a position that opposes the thick structure portion that is thicker than the thin structure portions situated at the both thin structure portion sides.

Furthermore, a plane of flatness of 5 μm is formed respectively on the upper or lower metallic mold such that standard surfaces 91a and 91b are formed on the both end portions in the longitudinal direction of the cavity 87. Hereupon, those standard surfaces 91a and 91b construct the standard surfaces for fixing the molded plastic products 86 on the other part(s). Each of the cavity pieces 81 and 82 respectively has a convex transferring surface 81a or 81b, both of the width 10 mm. As a result, the obtained molded plastic products 86 has a concave transferring surface.

A pressure sensor 88 is provided on the upper or lower metallic mold opposing to the cavity piece 83. The respective cavity pieces 83~85 slidably move on the basis of the detection signals transmitted from the pressure sensor 88. In FIG. 18b, the reference numerals 89 represents resin, 90 an air gap formed between the cavity piece 83 and the resin 89.

Next, the functional operation of the present embodiment is explained. First, cycloolefin copolymer, a non-crystal resin, is prepared as the resin of the present embodiment. Then, the metallic mold is heated to a temperature (136° C.) lower than the softening temperature of the resin (in the case of employing the non-crystal resin, a temperature lower than the glass critical point temperature) and the above temperature 136° C. is kept, and then the fused resin 89 heated to 280° C. is injected into the cavity 87 of the metallic mold in order to fill the cavity.

Since the cavity 87 is the one of a thick structure, a thick unbalanced structure, having same capacity as the shape of the molded plastic products 86, the resin 89 is quickly cooled and solidified with priority from the thin structure part of the end portion thereof and the surface layer portion thereof.

Next, when the average temperature from the surface layer portion to the center portion is equal to or higher than the softening temperature of the resin, and the resin inner pressure of the resin at the center thin structure portion becomes 8 MPa, as measured by the pressure sensor, the cavity piece 83 having a thickness smaller than the height of the side surface (almost equal to 8 mm) and perpendicular to the opposing transferring surface extending in a short-length direction of the cavity 87 (the cavity piece 83 has the thickness of 6 mm) is moved by 1 mm, and thereby the air gap 90 is formed between the resin 89 and the cavity piece 83. Immediately thereafter, the pressure in the air gap 90 turns out to be almost equal to the atmospheric pressure.

In such situation, 20 seconds after cooling, the cavity pieces 84 and 85 are moved by 1 mm and the air gap is formed between the cavity pieces 84 and 85 and the resin 89. Thereafter, the resin 89 is completely solidified. Next, when the temperature of the metallic mold becomes equal to 136° C., the metallic mold is opened and the molded plastic products 86 is taken out from the cavity 87 so as not to deform the molded plastic products 86.

A resulting molded plastic product 86 have a surface accuracy of 1.4 μm in the effective range thereof Furthermore, a standard surface having a flatness of 5 μm is transferred onto both of the end portions thereof in the longitudinal direction of the molded plastic products 86. The side surface portion of the molded plastic products 86 corresponding to the cavity pieces 83~85 is a free surface.

Therefore, it is impossible to create the accuracy of the convex/concave surface. However, the standard surface has an accuracy of the flatness for sufficiently satisfying the employment thereof.

In such manner, according to the present embodiment, after the air gap 90 is formed in the portion corresponding to the thin structure portion of the molded plastic products 86, the air gap is formed stepwisely in the portion corresponding to the thick structure portion of the molded article 86. Consequently, it is possible to prevent the pressure from remaining on the transferring surfaces corresponding to the respective places and so the inner distortion increases, and the accuracy on the transferring surface is lowered.

Namely, if the air gap is formed at the same time even in the thick structure portions on the basis of the temperature of the thin structure portion, and the resin inner pressure, since the thick structure portion has yet included a high-temperature portion of a temperature nearly equal to the fusing temperature, the heat or temperature is taken off by the cavity piece 83 and thereby the transferring property of the surrounding circumference and the transferring portion is lowered. On the contrary, in the present embodiment, the air gap is stepwisely formed from the portion corresponding to the thin structure portion of the molded plastic products 86 to the portion corresponding to the thick structure portion thereof, and thereby it is possible to prevent the pressure from remaining on the transferring surfaces corresponding to the respective places, so the inner distortion increases, and the surface accuracy of the transferring surface is lowered.

Furthermore, since the air gap is formed on an area excluding a part of the same side surface of the molded plastic products 86 and another area for not forming the air gap thereon is made as the standard surfaces 91a and 91b for fixing the molded plastic products 86 on the other parts, the accuracy of the standard surfaces 91a and 91b at the time of fixing the molded plastic products 86 on the other parts in addition to at least the transferring surface accuracy is secured and thereby the molded plastic products 86 can be fixed on the other parts with high accuracy, because of low necessity for high accuracy in the air gap forming portion. Furthermore, when a pressure sensor 88 is disposed in the neighborhood of the air gap 90 and the value of the pressure detected by the pressure sensor 88 becomes equal to a predetermined value (e.g., 8 MPa), since the air gap 90 is formed by slidably moving the cavity piece 83, the air gap can be formed by taking an optimum balance between the cooling/solidifying area on the outer circumferential portion of the resin 89 facing the wall surface of the cavity 87 and the area having a temperature not higher than the softening temperature at the center portion of the cavity 87, and thereby, the increase of the inner distortion and the lowering of the transferring property due to the pressure distribution is further improved.

Moreover, in the embodiments where the resin is composed of the non-crystal resin such as polycarbonate, cycloolefin copolymer, etc., the material is not limited to the above. Instead, it is also allowed to employ the other non-crystal resins such as polystyrene, polycarbonate, polymethyl methacrylate, amorphous polyolefin, Geonex made by Nippon Geon Co., Ltd., and Apel made by Mitsui Sekiyu Kagaku Co., Ltd., etc.

Ninth Embodiment

Figure 19:
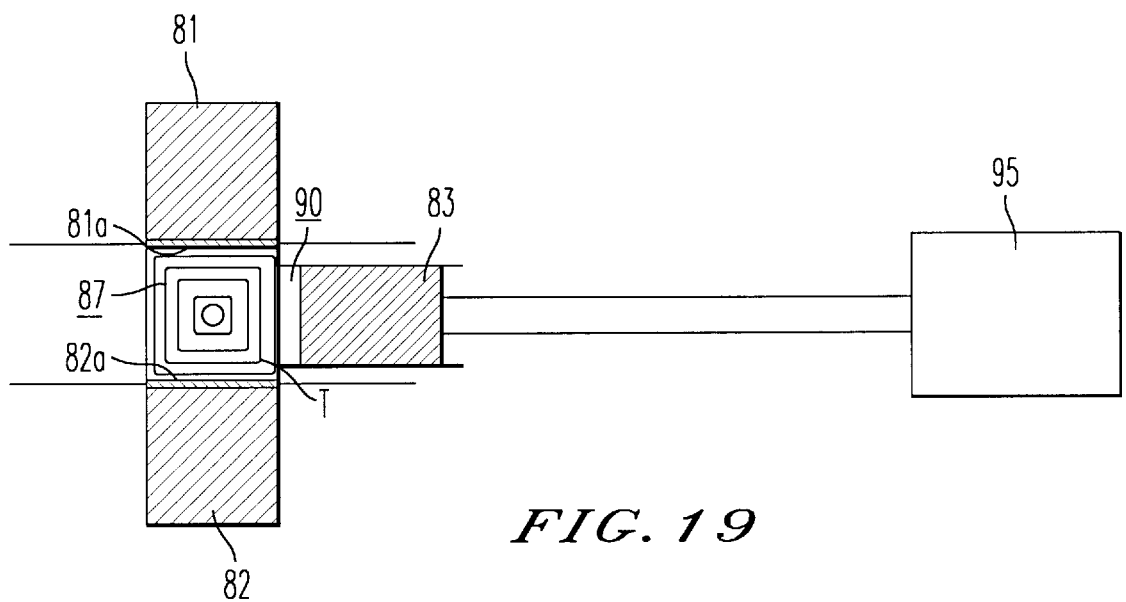
FIG. 19 is an outline cross-sectional view showing a seventh embodiment of the method of producing the molded plastic products.

FIG. 19 is an outlined cross-sectional view showing a ninth embodiment of the present invention. In the present embodiment, since the structure of the metallic mold has already been described, the explanation the mold is largely omitted. In FIG. 19, the cavity piece 83 is slidably moved as the slidably-moving medium by action of the oil-pressure cylinder. When the high-pressure fused resin fills the cavity 87, the cavity piece 83 is pressurized by the oil-pressure cylinder 95.

In the present embodiment, a computer is employed to sample the temperature distribution data of the resin in the cavity 87. When the temperature on a specified position in the cavity 83 corresponding to the cavity piece 83 becomes equal to a predetermined temperature of the sampled data, the computer controls the cavity piece 83 to slidably move in order to form the air gap 90.

To state more concretely, the transferring surfaces 81a and 82a are separated, and at the center of the cross section in the slidably moving direction of the cavity piece 83, the cooling time when the temperature of the resin 89 portion (shown by the temperature distribution T) situated on a position 1 mm inner from the opposing surface of the cavity piece 93 coincides with the glass critical point temperature (softening temperature) of the resin 89 is obtained as a predetermined temperature, and when the above-obtained time elapses, the cavity piece 83 is slidably moved in order to form the air gap 90 by the action of the oil-pressure cylinder 95. Moreover, the spiral-state lines (rectangular concentric circles) of FIG. 19 represent equal-temperature lines (temperature contour lines).

In such way, in the present embodiment, the temperature distribution data of the resin in the cavity 87 is previously sampled, and when the temperature on the specified position in the cavity 87 corresponding to the cavity piece 83 becomes equal to the predetermined temperature of the sampled data, the cavity piece 83 is slidably moved in order to form the air gap 90. Consequently, the air gap 90 can be formed with an optimum balance between the cooling/solidifying area of the outer circumferential portion of the resin facing the wall surface of the cavity 87 and the area on the cavity center portion of a temperature higher than the glass critical point temperature. In addition, the transferring property is lowered due to the increase of the inner distortion and the pressure distribution.

Furthermore, the reason why the transferring surface of the cavity 87 is divided and the aforementioned predetermined temperature is set to a value not lower than the glass critical point temperature of the resin at the cross-sectional center in the slidably moving direction of the cavity piece 83 is that the transferring surface of the cavity is divided and the predetermined temperature is set to a value not lower than the softening temperature of the resin at the cross-sectional center in the direction of slidably moving of the cavity piece 83, with the timing of forming the air gap in the optimum balance between the cooling/solidifying area of the resin outer circumferential portion of the resin to the wall surface of the cavity 87 and the area having a temperature higher than the softening temperature at the center portion of the cavity 87. Under such conditions, the resin is cooled to too low of a temperature, even when the air gap 90 is formed, the marginal area of the resin can be set to a low value, and the continued presence of the inner distortion and the occurrence of the undesirable transferring on the transferring surface is prevented.

As a matter of course, in case the air gap is partially formed in the thin structure portion, the transferring surface of the cavity on that portion is divided, and the predetermined temperature becomes equal to the temperature on the center of the cross section in the slidably moving direction.

Furthermore, since the cavity piece 83 is slidably moved using the oil-pressure cylinder separately provided from the cavity piece 83, the structure of the plastic molding apparatus is simplified.

Hereupon, although an oil-pressure cylinder using the oil pressure as a slidably moving medium is provided in the present embodiment, the slidably moving medium is not limited to the oil-pressure cylinder. It is also allowable to employ an electric motor using electricity and an air cylinder utilizing the air, etc.

Moreover, in the case of slidably moving the cavity piece 83 and the cavity pieces 84 and 85 in a multi-step fashion as shown previously, the cavity pieces 83, 84 and 85 are slidably moved in order to form the air gap on the basis is of at least one of the resin pressure detected by the pressure sensor 88 and the resin temperature based on the above-mentioned temperature distribution data. In such a manner, residual pressure on the transferring surfaces corresponding to the respective places is prevented, the inner distortion increases, and the lowering of the transferring surface accuracy occurs. Moreover, when the air gap is first formed, since the resin pressure approaches the atmospheric pressure, it is effective to form the air gap on the basis of the temperature data instead of the pressure signal (data) in the case of forming the air gap in the lower stage(s) subsequent to the second stage.

Figure 20A:
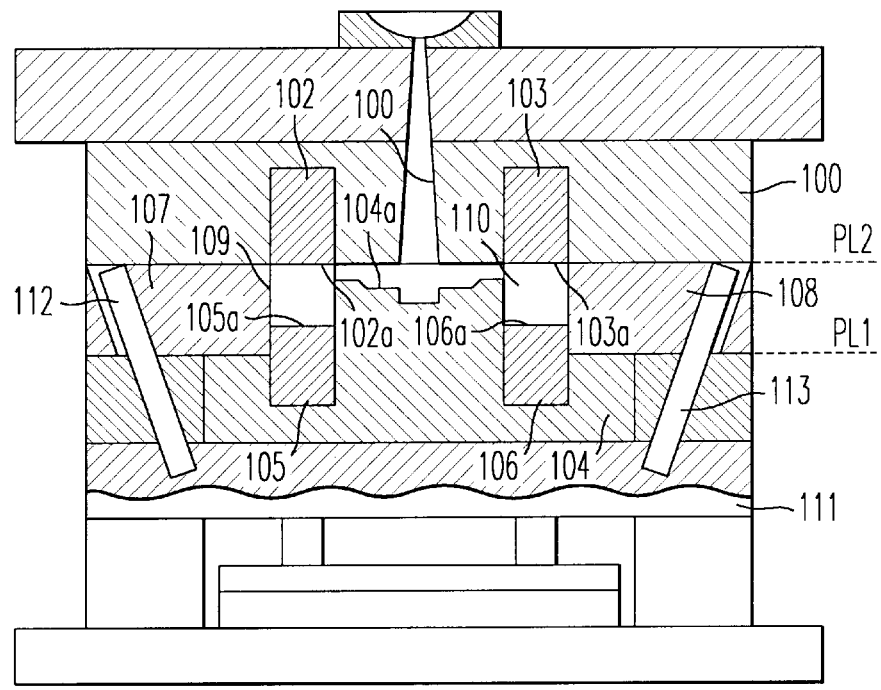
FIGS. 20a and 20b are cross-sectional views showing an eighth embodiment of the method of producing the molded plastic products, where
Figure 20B:
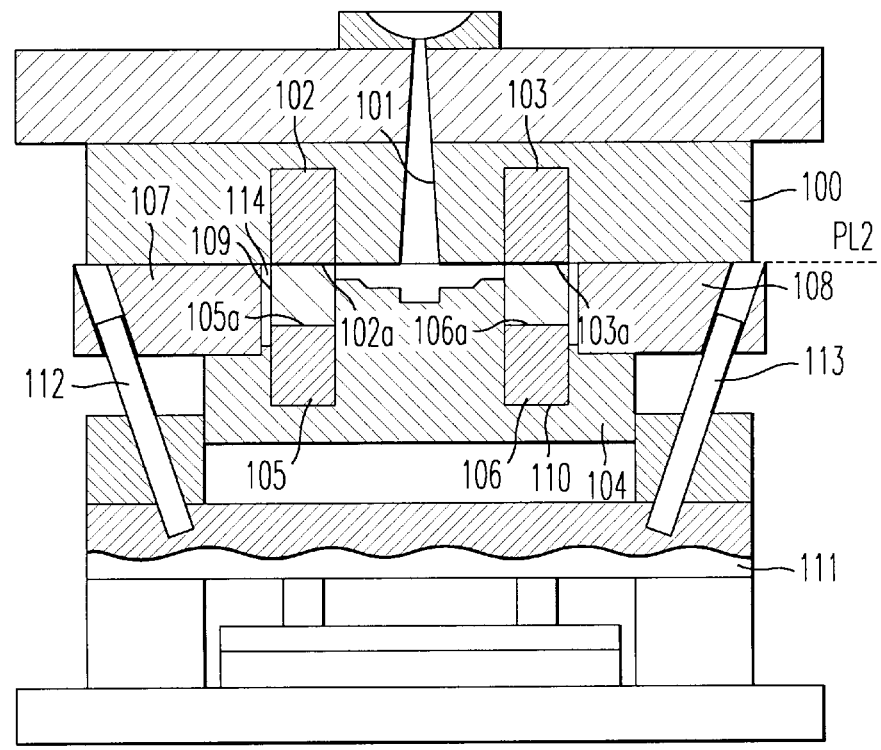

FIG. 20 shows another embodiment (tenth) of the present invention, directed to the method of molding the molded plastic products, wherein FIG. 20a is an outlined cross-sectional view of the metallic mold, and FIG. 20b is an outlined cross-sectional view of the metallic mold at the time of forming the air gap.

In FIGS. 20a and 20b, the reference numeral 100 represents an upper metallic mold having a sprue 101. Two cavity pieces 102 and 103 respectively having transferring surfaces 102a and 103a formed thereon for constructing the mirror surface are provided in the upper metallic mold 100. Furthermore, a lower metallic mold 104 is provided so as to oppose to the upper metallic mold 100. Two cavity pieces 105 and 106 respectively having transferring surfaces 105a and 106a formed thereon for constructing the mirror surface are provided in the lower metallic mold 104.

Furthermore, other cavity pieces 107 and 108 on which the transferring surfaces are not formed are provided between the upper metallic mold 100 and lower metallic mold 104. In the present embodiment, two cavities 109 and 110 are formed by use of the cavity pieces 102, 103, 107, and 108 and the lower metallic mold 104. The fused resin is injected into the cavities 109 and 110 in order to fill the cavities 109 and 110 with the fused resin through the space between the recess portion 104a formed on the sprue 101 and the lower metallic mold 104 and the upper metallic mold 100.

Angular pins 112 and 113 provided on an abutment (stand) 111 so as to incline by a predetermined angle are respectively inserted into the cavity pieces 107 and 108. When the abutment 111 is brought close to and parted from the cavity pieces 107 and 108, the cavity pieces 107 and 108 are slidably moved thereby. When the abutment 111 is parted from the cavity pieces 107 and 108, the cavity pieces 107 and 108 respectively form air gaps 114 and 115 between the (solidified) resin injected into the respective cavities 109 and 110 in order to fill the cavities and the cavity pieces 107 and 108 themselves.

Next, the functional operation of the present embodiment is explained. First, polycarbonate which is non-crystal resin is prepared as the resin for the present embodiment. Then, as shown in FIG. 20a, the temperature of the metallic mold is kept to a temperature of 142° C., lower than the softening temperature of the resin (in the case of employing the non-crystal resin, a temperature lower than the glass critical point temperature). Next, the fused resin of 300° C. is respectively injected into the cavities 109 and 110 of the metallic mold so as to fill the cavity with the fused resin.

Since the cavities 109 and 110 have a thick structure, unbalanced thickness structure, they have the same shape and volume as the molded plastic products to be molded, the resin is sharply cooled and solidified with priority from the thin structure portion at the end portion and the surface layer portion.

After injecting the fused resin into the cavity so as to fill the cavity with the resin, the abutment 111 is moved downward 40 seconds after the controlled pressure is generated, the cavity pieces 107 and 108 are respectively moved along the angular pins 112 and 113 by separating the contact surface PL1 of the cavity pieces 107 and 108 from the abutment 111, and then the cavity pieces 107 and 108 are parted from the thin structure portion of the resin and thereby air gaps 114 and 115 are formed between the thin structure portion and the cavity pieces 107 and 108. (Refer to FIG. 20*b*).

Next, after keeping the above state until the resin is completely cooled, the upper metallic mold 100 is moved downward and the cavity pieces 107 and 108 are separated from the contact surface PL1 of the upper metallic mold 100. Thereby, the cavity pieces 102 and 103 of the lower metallic mold 104 are respectively parted from the cavity pieces 105 and 106, and then the molded plastic products are taken out from the cavities 109 and 110.

Furthermore, after the upper metallic mold 100 is moved downward, when the lower metallic mold 104 is moved upward, the metallic mold returns to the (initial) state as shown in FIG. 20*a*. Consequently, it becomes possible to execute the subsequent molding works.

In such way, according to the present embodiment, since the cavity pieces 107 and 108 are slidably moved in order to form the air gaps 114 and 115 utilizing the force of opening force of the metallic mold, the cavity piece can be slidably moved by utilizing the mechanism of opening the metallic mold which has been already provided in the plastic molding metallic mold. Consequently, the cavity piece can be slidably moved, and there is no need to further add the new facilities, and the molded plastic products can be molded at low cost.

Figure 21:
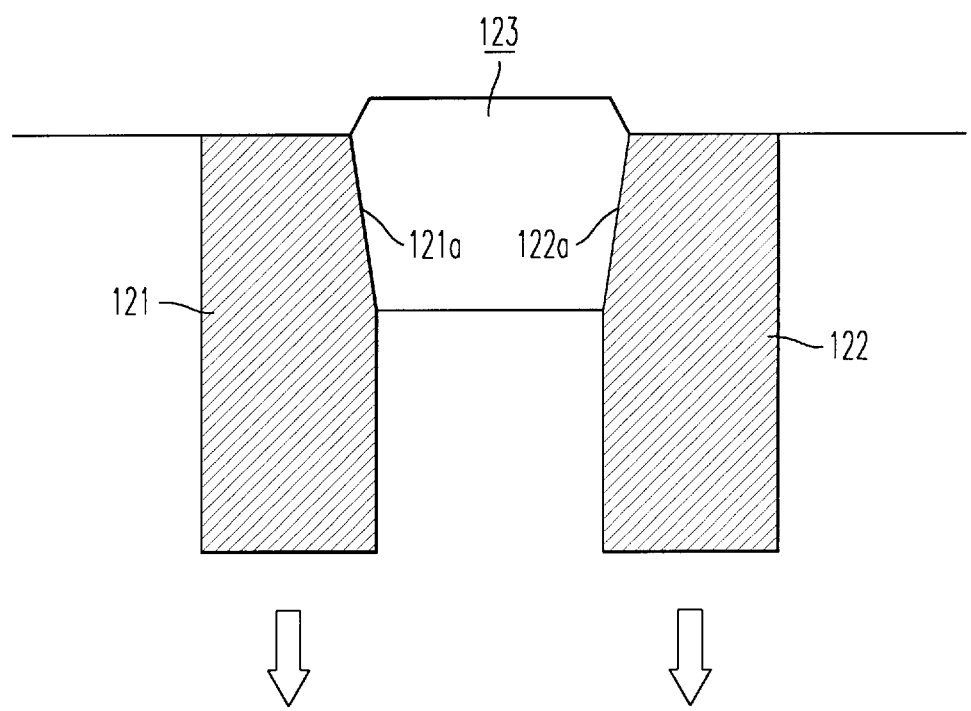
FIG. 21 is a structural view of the metallic mold showing the other status of the eighth embodiment.

Furthermore, in the present embodiment, although the cavity pieces 107 and 108 are slidably moved by use of the angular pins 112 and 113, the method is not limited to the above description. As shown in FIG. 21, tapers 121*a* and 122*a* are respectively provided on the cavity pieces 121 and 122 corresponding to the cavity pieces 105 and 106, and the cavity pieces 121 and 122 are moved downward from the contact surface corresponding the contact surface PL1 shown in FIG. 20. Thereby, an air gap can be formed between the resin injected into the cavity 123 to fill it with the resin and the cavity pieces 121 and 122.

As is apparent from the foregoing descriptions, according to the present invention, several advantageous functional effects can be attained.

According to the first status of the invention, the contraction occurring at the time of cooling can be absorbed by moving the resin portion facing the air gap. The resin portion facing the air gap is shrunk with priority and thereby the occurrence of shrinkage on the transferring surface can be prevented, and further the desired transferring surface can be faithfully transferred with a short molding cycle. Furthermore, since the resin inner pressure exerted on the transferring surface at the time of cooling can be approximated to the atmospheric pressure, it is possible to obtain the molded plastic products of small optical elasticity distortion.

According to the second status of the invention, when the air gap is formed at the time of cooling, the surface for forming the air gap comes into close contact with the resin. However, since the surface layer of the resin is solidified, the peeling-off thereof can be easily done and the surface layer at the time of peeling off can be prevented from being largely deformed. Furthermore, since the average temperature is not lower than the softening temperature of the resin after forming the air gap by the action of the peeling-off, on the contrary the temperature of the resin portion can be raised to the softening temperature of the resin so as to lower the resin low-viscosity, owing to the heat-shutting effect of the resin portion facing the air gap and the uniformalization of the temperature. Consequently, the resin portion can be easily moved.

According to the third status of the invention, the pressure in the air gap is set to a value in the range of 0.5 MPa–6 MPa and thereby a constant pressure can be held so as to enhance the contracting movement of the resin portion facing the air gap at the time of cooling the resin.

According to the fourth status of the invention, the transferring property of the transferring surface when the air gap is formed can be prevented from being lowered.

According to the fifth status of the invention, the slidably-moving property of the cavity piece can be employed, and, in addition, the peeling-off of the resin from the cavity surface for forming the air gap can be done easily, and thereby the easiness of the molding works can be improved.

According to the sixth status of the invention, since the contracting property of the resin is preferable, high molding accuracy is obtained easily.

According to the seventh status of the invention, an entire surface adjacent to the transferring surface can be released at the time of forming the air gap, the resin facing the air gap is contracted easily in case that the resin is contracted by the cooling thereof, and thereby ensuring the transferring accuracy of the transferring surface.

According to the eighth status of the invention, the resin portion coming into contact with the air gap can be prevented from being unnecessarily deformed and thereby an unfavorable influence is not exerted on the molded plastic products.

According to the ninth status of the invention, even in the case of forming the molded plastic products of thick structures and unbalanced thickness structures, it is possible to obtain the molding products will small distortion and securing the shape accuracy an the transferring surface. Furthermore, even in case that the temperature of the metallic mold is set to a temperature not higher than the softening temperature of the resin, since a desired shape accuracy can be secured, the cooling time of the resin can be shortened and the molding time of the molded plastic products can be also shortened. Consequently, the manufacturing cost of the molded plastic products can be reduced.

According to the tenth status of the invention, a concave-shape molding surface or a convex-shape molding surface can be selectively formed on the molding surface of the resin formed by the cavity piece(s). Moreover, in case that the resin pressure at the time of parting is made lower than 0.5 MPa, the transferring surface is unpreferably peeled off. On the contrary, in case that the resin pressure at the time of parting is made not lower than 60 MPa, the inner stress of the molded plastic products itself increases and thereby the remaining stress remains unfavorably.

According to the eleventh status of the invention, the cavity piece can be prevented from moving in a direction of parting from the resin by the action of the resin pressure occurring when the fused resin is injected into the cavity to fill the cavity.

According to the twelfth status of the invention, since the pressurizing and slidably-moving of the cavity piece can be done, by use of the driving medium composed of the oil-pressure cylinder or the electrically-driven motor, the pressure control apparatus can be made with a simple structure and thereby the metallic mold for molding the molded plastic products can be made also with a simple structure.

According to the thirteenth status of the invention, since the resin inner pressure or the movement timing of the cavity piece can be controlled with high precision, the molded plastic products can be successively molded and at the same time the convex or concave surface can be stably formed on the molding surface of the resin facing the air gap.

According to the fourteenth status of the invention, when the cavity piece is moved so as to part from the resin, the air is caused to flow into the air gap between the cavity piece and the resin and thereby the pressure in the air gap can equalize to the atmospheric pressure and the cavity piece can be promptly parted from the resin. As the result, the concave or convex surface can be stably formed and the shape accuracy can be improved.

According to the fifteenth status of the invention, the atmospheric air can surely flow through the vent hole into the air gap between the cavity piece and the resin.

According to the sixteenth status of the invention, the cavity piece can be easily parted from the resin and thereby the shape accuracy of the transferring surface can be improved.

According to the seventeenth status of the invention, the cavity piece can be easily parted from the resin and the shape accuracy of the transferring surface can be improved. In addition, the durability of the slidably-moving surface between the cavity piece and the metallic mold for molding the resin, and thereby the life time of the metallic mold can be improved (made longer).

According to the eighteenth status of the invention, when the transferring surface is transferred to the resin by the action of the resin pressure formed in the cavity, curved surface or plain surface can be formed on the molding surface of the resin at the cavity piece side, and when the cavity piece is parted from the resin, the concave and convex surface can be selectively formed over the wide area of the molding surface of the resin at the cavity piece side. As the result, the shape accuracy of the transferring surface can be further improved.

According to the nineteenth status of the invention, although there is a fear that the air gets into the air gap between the cavity piece and the resin through the vent hole and thereby the shape accuracy of the molded plastic products deteriorates, the air can be prevented from getting into the air gap between the cavity piece and the resin through the vent hole by forming a step portion on the connecting surface between the cavity piece and the transferring surface. Consequently, the shape accuracy of the molded plastic products can be prevented from becoming deteriorated.

According to the twentieth status of the invention, the air gap is formed with priority between the cavity piece and the resin with the timing such that the non-transferring surface corresponding to the molded plastic products, thin-thickness portion, the solidifying of which progresses rapidly, can move as the free surface. In such a structure, the increase of the internal distortion and the lowering (deterioration) of the transferring property due to the pressure distribution can be prevented.

According to the twenty-first status of the invention, the air gap is formed in a multi-step manner (multiple-stepwisely) in an area from the portion corresponding to the thick structure portion thereof, it can be prevented that the pressure remains on the transferring surfaces corresponding to the respective places and thereby the internal distortion increases and the transferring accuracy is lowered.

According to the twenty-second status of the invention, since the accuracy of the air gap forming portion in not necessitated in the present invention, the accuracy of the standard surface at the time of fixing on the other parts in addition to at least the accuracy of the transferring surface is secured, and thereby the molded plastic products can be fixed on the other parts with high accuracy.

According to the twenty-third and twenty-fourth statuses of the invention, the air gap can be formed with the optimum balance between the cooling/solidifying area on the outer circumferential portion of the resin facing the cavity wall surface and the area of a temperature higher than the softening temperature and the cavity center portion. Consequently, it is possible to prevent, to a further extent, the internal distortion increases and the transferring property being lowered due to the pressure distribution.

According to the twenty-fifth status of the invention, even in the case of forming the air gap when the resin is cooled to an excessively low temperature, the margin of the resin can be lowered. Consequently, it can be prevented that the internal distortion remains and the transferring defect occurs on the transferring surface.

According to the twenty-sixth status of the invention, in the case of forming the air gap in a multi-step manner, it is possible to prevent to a further extent the pressure remaining on the transferring surfaces corresponding to the respective places and the internal distortion increases, and thereby the lowering of the transferring surface accuracy occurs.

According to the twenty-seventh status of the invention, the construction of the plastic molding apparatus can be simplified.

According to the twenty-eighth status of the invention, since the cavity piece can be slidably moved by utilizing the metallic mold opening mechanism which has been already provided in the plastic molding metallic mold, it is not necessary to further add the new facilities and thereby the molded plastic products can be formed with low manufacturing cost.

The computer-based processes set forth in the present description may be implemented using a conventional general purpose microprocessor programmed according to the teachings of the present specification, as will be appreciated to those skilled in the relevant art(s). Appropriate software coding can readily be prepared by skilled programmers based on the teachings of the present disclosure, as will also be apparent to those skilled in the relevant art(s).

Heretofore, the embodiments of the molded plastic products producing method and the other embodiments of the metallic mold for producing the molded plastic products have been described. However, the present invention is not limited to the above. Many other embodiments of the modifications (variations) thereof can be realized in the present invention.

What is claimed as new and desired to be secured by Letters Patent of the United States is:

1. A method of producing a molded plastic products comprising the steps of:

preparing a metallic mold having at least one transferring surface and at least one or more cavity pieces having at least one surface excluding said at least one transferring surface, and including at least one cavity formed therein defined by said at least one transferring surface and said at least one or more cavity pieces;

heating said metallic mold to a heating temperature lower than a softening temperature of a resin;

filling said at least one cavity with said resin when said resin is in a fused state and heated to a temperature higher than the softening temperature of said resin, by injecting said resin in said at least one cavity;

generating a pressure on said at least one transferring surface and causing said resin to adhere to said at least one transferring surface;

cooling said resin such that a first portion of said resin is cooled to a temperature lower than the softening temperature of said resin;

parting said at least one or more cavity pieces from said resin by sliding said at least one or more cavity pieces from said resin while a second portion of said resin remains at or above the softening temperature of said resin, and forcibly forming thereby an air gap between said resin and said at least one or more cavity pieces, and opening said metallic mold and removing said resin after the second portion of the resin is cooled below the softening temperature of the resin.

2. The method of producing the molded plastic products as defined in claim 1, further comprising the step of:

setting a starting time of forming said air gap by causing said at least one or more cavity pieces to part when a center portion of said resin in said at least one cavity is not lower than the softening temperature of said resin when a surface layer portion thereof being at a temperature lower than the softening temperature of said resin, and when an average temperature from said surface layer portion to said center portion being not lower than the softening temperature of said resin.

3. The method of claim 1, further comprising the step of:

setting the pressure on said at least one or more cavity pieces to be in an inclusive range from between 0.05 MPa to 6 MPa.

4. The method of claim 2, further comprising the step of setting the pressure between said at least one or more cavity pieces to be in an inclusive range from between 0.05 MPa to 6 MPa.

5. The method of claim 1, further comprising the step of:

setting the pressure on the at least one transferring surface to a value in an inclusive range of 0.5 MPa to 60 MPa immediately before forming said air gap while sliding said at least one or more cavity pieces.

6. The method of claim 2, further comprising the step of:

setting the pressure on the at least one transferring surface to a value in an inclusive range of 0.5 MPa to 60 MPa immediately before forming said air gap while sliding said at least one or more cavity pieces.

7. The method of claim 3, further comprising the step of:

setting the pressure on the at least one transferring surface to a value in an inclusive range of 0.5 MPa to 60 MPa immediately before forming said air gap while sliding said at least one or more cavity pieces.

8. The method of claim 4, further comprising the step of:

setting the pressure on the transferring surface to a value in an inclusive range of 0.5 MPa to 60 MPa immediately before forming said air gap while sliding said at least one or more cavity pieces.

9. The method of claim 1, further comprising the steps of:

preparing said at least one or more cavity pieces with a material having fine holes therein;

pumping a gas through said fine holes toward a side of said resin; and causing said at least one or more cavity pieces to slide in order to form said air gap.

10. The method of claim 1, wherein:

said filling step comprises filling said at least one cavity with a non-crystal substance resin as said resin, and a softening temperature of said non-crystal substance resin being equal to a glass critical point temperature.

11. The method of claim 1, further comprising the steps of:

bringing said at least one or more cavity pieces into contact with a mold surface adjacent to said at least one transferring surface; and forming said air gap on the surface adjacent to said at least one transferring surface when said at least one or more cavity pieces are caused to slide.

12. The method of claim 1 wherein said forming step comprises forming said air gap to be not less than 1 mm in width.

13. The method of claim 1, wherein said preparing step comprises making at least one of said at least one or more cavity pieces out of a porous material and supplying nitrogen gas into said at least one cavity through the fine holes of said porous material.

14. The method of claim 1, wherein said preparing step comprises fixing at least one of said at least one or more cavity pieces on the metallic mold, and fixing another of the at least one or more cavity pieces on another metallic mold, and movably mounting another of the at least one or more cavity pieces on yet another metallic mold.

15. The method of claim 1, wherein said heating step comprises keeping the temperature of said metallic mold at a level equal to or lower than the glass critical point temperature of said resin, and subsequently performing said filling step so as to fill said at least one cavity with said resin.

16. A method of producing a molded plastic product, comprising the steps of:

preparing a mold having at least one transferring surface for transferring a mirror surface onto a resin, and having at least one or more cavity pieces including a slidable cavity piece that is controllably configured to slide away from said resin, a cavity being defined by cavity walls including said at least one transferring surface and said at least one or more cavity pieces;

keeping a temperature of said metallic mold lower than a softening temperature of said resin;

filling said cavity with said resin when said resin is in a fused state, by injecting said resin at a temperature higher than a softening temperature of said resin;

cooling said resin such that a first portion of said resin is cooled to a temperature lower than the softening temperature of said resin after generating a resin pressure against said at least one transferring surface and attaching said resin onto said at least one transferring surface;

slidably moving said slidable cavity piece away from said resin while a second portion of said resin remains at or above the softening temperature of said resin, forming forcibly an air gap between a portion of said cavity walls excluding said at least one transferring surface and said slidable cavity piece by sliding the slidable cavity piece away from said resin, and forming a part corresponding to a thin structure portion of said molded plastic product when said air gap is formed; and opening said metallic mold and removing said plastic molded plastic product after the second portion of the resin is cooled below the softening temperature of the resin.

17. The method of claim 16,
wherein said air gap is formed in multiple steps at a part corresponding to a thick structure portion of said molded plastic product, after forming said air gap next to a part corresponding to a thin structure portion of said molded plastic product.

18. The method of claim 16, wherein said step of forcibly forming said air gap comprises forcibly forming said air gap in a portion of said molded plastic product that is not a standard portion of said molded plastic product.

19. The method of claim 17, wherein said step of forcibly forming said air gap comprises forcibly forming said air gap in a portion of said molded plastic product that is not a standard portion of said molded plastic product.

20. The method of claim 16, further comprising the steps of:
detecting a pressure in said cavity with a pressure sensor; and
employing the pressure detected by said pressure sensor to trigger said forming forcibly step.

21. The method of claim 17, further comprising the steps of:
detecting a pressure in said cavity with a pressure sensor; and
employing the pressure detected by said pressure sensor to trigger said forming forcibly step.

22. The method of claim 18, further comprising the steps of:
detecting a pressure in said cavity with a pressure sensor; and
employing the pressure detected by said pressure sensor to trigger said forming forcibly step.

23. The method of claim 19, further comprising the steps of:
detecting a pressure in said cavity with a pressure sensor; and
employing the pressure detected by said pressure sensor to trigger said forming forcibly step.

24. The method of claim 16, further comprising the steps of:
obtaining samples of temperature distribution data of said resin in said cavity; and
performing said forming forcibly step when the temperature at a predetermined position in said cavity corresponding to said slidable cavity piece equals a predetermined temperature.

25. The method of claim 17, further comprising the steps of:
obtaining samples of temperature distribution data of said resin in said cavity; and
performing said forming forcibly step when the temperature at a predetermined position in said cavity corresponding to said slidable cavity piece equals a predetermined temperature.

26. The method of claim 18, further comprising the steps of:
obtaining samples of temperature distribution data of said resin in said cavity; and
performing said forming forcibly step when the temperature at a predetermined position in said cavity corresponding to said slidable cavity piece equals a predetermined temperature.

27. The method of claim 19, further comprising the steps of:
obtaining samples of temperature distribution data of said resin in said cavity; and
performing said forming forcibly step when the temperature at a predetermined position in said cavity corresponding to said slidable cavity piece equals a predetermined temperature.

28. The method of claim 24, wherein said step of preparing comprises preparing the metallic mold with the at least one transferring surface being divided into sections, said predetermined temperature being set to a value equal to or higher than the softening temperature of said resin at a cross-sectional surface centered in a slidably moving direction of said slidable cavity piece.

29. The method of claim 25, wherein said step of preparing comprises preparing the metallic mold with the at least one transferring surface being divided into sections, said predetermined temperature being set to a value equal to or higher than the softening temperature of said resin at a cross-sectional surface centered in a slidably moving direction of said slidable cavity piece.

30. The method of claim 26, wherein said step of preparing comprises preparing the metallic mold with the at least one transferring surface being divided into sections, said predetermined temperature being set to a value equal to or higher than the softening temperature of said resin at a cross-sectional surface centered in a slidably moving direction of said slidable cavity piece.

31. The method of claim 27, wherein said step of preparing comprises preparing the metallic mold with the at least one transferring surface being divided into sections, said predetermined temperature being set to a value equal to or higher than the softening temperature of said resin at a cross-sectional surface centered in a slidably moving direction of said slidable cavity piece.

32. The method of claim 20, wherein said forming forcibly step comprises forming said air gap by slidably moving said slidable cavity piece based on at least one the pressure detected by said pressure sensor and the temperature of the resin from said temperature distribution data reaching a predetermined threshold.

33. The method of claim 16, wherein said forming forcibly step comprises forming said air gap by slidably moving said slidable cavity piece with a slidably moving means provided separately from said slidable cavity piece.

34. The method of claim 16, wherein said forming forcibly step comprises forming said air gap by slidably moving said slidable cavity piece using a force used to open said metallic mold.

35. The method of claim 16, wherein said preparing step comprises preparing at least one of said cavity pieces to have the transferring surface but another of said cavity pieces not having the transferring surface.

36. The method of claim 35, wherein said preparing step further comprises including a pair of convex mirror surfaces on at least one of said cavity pieces have a transferring surface, and forming said cavity with said cavity pieces having said transferring surface and others not having the transferring surface.

37. The method of claim 16, wherein said filling step comprises filling said cavity with a non-crystal resin.

38. The method of claim 37, wherein said filling step comprises filling said cavity with the non-crystal resin being at least one of polycarbonate, cycloolefin copolymer, polystyrene, polymethyl methacrylate, and amorphous polyolefin.

* * * * *

UNITED STATES PATENT AND TRADEMARK OFFICE
CERTIFICATE OF CORRECTION

PATENT NO. : 6,015,514
DATED : January 18, 2000
INVENTOR(S) : Hisaaki Koseko

It is certified that error appears in the above-identified patent and that said Letters Patent is hereby corrected as shown below:

On the title page, item [30], the Foreign Application Priority Data is incorrectly listed. It should be:

--[30] Foreign Application Priority Data

Nov. 7, 1996 [JP] Japan..................8-294689
May 16, 1997 [JP] Japan..................9-126151
June 20, 1997 [JP] Japan..................9-164316--

Signed and Sealed this

Nineteenth Day of June, 2001

*Attest:*

*Attesting Officer*

NICHOLAS P. GODICI
*Acting Director of the United States Patent and Trademark Office*